United States Patent
Abe et al.

(10) Patent No.: US 8,165,617 B2
(45) Date of Patent: Apr. 24, 2012

(54) WIRELESS COMMUNICATION APPARATUS AND COMMUNICATION CONTROL METHOD

(75) Inventors: Katsuaki Abe, Osaka (JP); Akihiko Matsuoka, Kanagawa (JP); Kentaro Miyano, Kanagawa (JP); Takenori Sakamoto, Tokyo (JP); Tomoya Urushihara, Chiba (JP)

(73) Assignee: Panasonic Corporation, Osaka (JP)

( * ) Notice: Subject to any disclaimer, the term of this patent is extended or adjusted under 35 U.S.C. 154(b) by 1064 days.

(21) Appl. No.: 12/066,064

(22) PCT Filed: Aug. 29, 2006

(86) PCT No.: PCT/JP2006/316922
§ 371 (c)(1),
(2), (4) Date: Mar. 26, 2008

(87) PCT Pub. No.: WO2007/029556
PCT Pub. Date: Mar. 15, 2007

(65) Prior Publication Data
US 2009/0104880 A1  Apr. 23, 2009

(30) Foreign Application Priority Data
Sep. 7, 2005 (JP) .................................. 2005-259738

(51) Int. Cl.
*H04B 7/00* (2006.01)
(52) U.S. Cl. .................. 455/514; 455/412.1; 455/414.1; 455/550.1; 710/106; 710/308; 711/103
(58) Field of Classification Search .................. 455/403, 455/514, 414.1, 73, 550.1, 418–419, 90.3, 455/552.1, 553.1, 412.1, 560; 710/308, 313, 710/302, 106; 711/103, 166, 154; 714/6
See application file for complete search history.

(56) References Cited

U.S. PATENT DOCUMENTS

| 6,055,418 | A  | * | 4/2000 | Harris et al. ..................... 455/91 |
| 6,912,256 | B1 |   | 6/2005 | Noblet |
| 7,016,677 | B2 | * | 3/2006 | Fukasawa et al. ......... 455/435.1 |

(Continued)

FOREIGN PATENT DOCUMENTS

JP    1999-317688    11/1999

(Continued)

OTHER PUBLICATIONS

International Search Report dated Oct. 31, 2006.

*Primary Examiner* — Pablo Tran
(74) *Attorney, Agent, or Firm* — Dickinson Wright PLLC

(57) ABSTRACT

A wireless communication apparatus and a communication control method wherein even if there occurs a change in communication control information due to a function change, an appropriate correction is implemented to improve the communication quality. A wireless communication apparatus (100) comprises a plurality of reconfigurable function parts (reconfigurable function modules (1031)) that reconfigure functions related to communication to perform digital signal processings according to a plurality of communication formats; and a communication operation control function part that controls the communication operation. Each of the reconfigurable function parts includes a property register (10311) in which the communication control information is written. The communication operation control function part includes a reconfiguration control section (107) that overwrites the communication control information in the property register each time the communication function is reconfigured; and a communication control section (104) that performs a communication control based on the communication control information held in the property register.

12 Claims, 10 Drawing Sheets

U.S. PATENT DOCUMENTS

| | | | |
|---|---|---|---|
| 7,120,758 B2 * | 10/2006 | Jones et al. | 711/147 |
| 7,831,204 B1 * | 11/2010 | Harvey et al. | 455/39 |
| 7,979,616 B2 * | 7/2011 | Bravo et al. | 710/107 |
| 8,024,495 B2 * | 9/2011 | Aoki | 710/22 |
| 2002/0111187 A1 | 8/2002 | Harada | |
| 2006/0003795 A1 | 1/2006 | Yamanaka | |
| 2006/0022803 A1 * | 2/2006 | Akiyama et al. | 340/10.34 |
| 2006/0035671 A1 | 2/2006 | Mukai | |
| 2007/0298711 A1 * | 12/2007 | Ogushi | 455/39 |
| 2008/0307132 A1 * | 12/2008 | Zaks et al. | 710/106 |
| 2009/0119468 A1 * | 5/2009 | Taylor et al. | 711/166 |
| 2010/0274986 A1 * | 10/2010 | Matsumoto | 711/166 |
| 2011/0195693 A1 * | 8/2011 | Nagasawa et al. | 455/412.2 |
| 2011/0302476 A1 * | 12/2011 | Lee et al. | 714/763 |

FOREIGN PATENT DOCUMENTS

| | | |
|---|---|---|
| JP | 3348196 | 12/1999 |
| JP | 2002-141823 | 5/2002 |
| JP | 2002-335186 | 11/2002 |
| JP | 2004-153800 | 5/2004 |
| JP | 2004-343559 | 12/2004 |
| JP | 2005-223788 | 8/2005 |

* cited by examiner

| ADDRESS | PROPERTY REGISTER |
|---|---|
| #0x | TRANSMITTING SECTION |
| #00 | INPUT CLOCK RATE |
| #01 | OUTPUT CLOCK RATE |
| #02 | INPUT BUFFER SIZE |
| #03 | OUTPUT BUFFER SIZE |
| #04 | CIRCUIT SIZE |
| #05 | PROCESSING LATENCY : PLURAL MODES |
| #06 | GAIN : PLURAL MODES |
| ⋮ | ⋮ |
| #1x | TRANSMITTING SECTION |
| #10 | INPUT CLOCK RATE |
| #11 | OUTPUT CLOCK RATE |
| #12 | INPUT BUFFER SIZE |
| | ⋮ |
| #8x | Mode #0 |
| #80 | TRANSMISSION PROCESSING LATENCY : MODE #0 |
| #81 | TRANSMISSION GAIN : MODE #0 |
| #82 | RECEPTION GAIN : MODE #0 |
| | ⋮ |
| #9x | Mode #1 |
| #90 | TRANSMISSION PROCESSING LATENCY : MODE #1 |
| #91 | TRANSMISSION GAIN : MODE #1 |
| #92 | RECEPTION GAIN : MODE #1 |
| | ⋮ |

FIG.7

WIRELESS COMMUNICATION APPARATUS AND COMMUNICATION CONTROL METHOD

TECHNICAL FIELD

The present invention relates to a wireless communication apparatus and a communication control method. More particularly, the present invention relates to a wireless communication apparatus that supports a plurality of wireless communication schemes, a wireless communication apparatus and a communication control method for switching parameters of wireless communication schemes adaptively.

BACKGROUND ART

In recent years, with rapid spread of demand for wireless communication, various wireless communication standards using different wireless communication schemes have been used and co-existed. Among them, a wireless communication apparatus having a so-called multimode function for supporting a plurality of different wireless communication schemes and providing users with a seamless connection environment has been strongly demanded.

For example, for an example of a method for implementing multimode functions in wireless communication apparatus, as disclosed in Patent Document 1 and Patent Document 2, a method for enabling switching of wireless communication functions in wireless communication apparatus by changing software programs, configuration parameters, etc, has been proposed. This configuration is called a software defined radio or a reconfigurable wireless apparatus.

Next, as an example, the configuration and operation of the conventional software defined radio that changes its function to supporting a plurality of wireless communication systems will be described with reference to FIG. 1. To be more specific, the switching of the function of the software defined radio between a wireless communication scheme supporting a WCDMA (wideband CDMA) mobile telephone system standard, which is one of the third-generation mobile telephone system standard (hereinafter referred to as the "WCDMA scheme") and a wireless communication scheme supporting an IEEE802.11a standard, which is one of the wireless LAN systems (hereinafter "the IEEE802.11a scheme") will be described below.

In FIG. 1, wireless communication apparatus 10 can change its wireless communication process function, and includes analog signal processing section 15, analog-to-digital converting section 20, reconfigurable digital signal processing section 30, bus 60, reconfiguration control bus 65, communication control section 70, timer 75, reconfiguration memory 80, and reconfiguration control section 85. Analog signal processing section 15, analog-to-digital converting section 20, and reconfigurable digital signal processing section 30 are configured to change process functions by changing software programs or configuration parameters.

Reconfigurable digital signal processing section 30 includes reconfigurable signal processing module 40, I/O sections 35 and 50, and a general-purpose memory 55. Reconfigurable signal processing module 40 performs a series of digital wireless communication processes supporting the WCDMA scheme and the IEEE802.11a scheme, such as codec processes, modem processes, a multiplexing process, a synchronization process, and a filtering process. Reconfiguration control section 85 changes the process functions of the reconfigurable signal processing module by reading predetermined configuration software programs or configuration parameters stored in reconfiguration memory 80 and supplying the read information to the reconfigurable signal processing module through reconfiguration control bus 65.

For example, when the function of wireless communication apparatus 10 is changed to support the WCDMA scheme, reconfigurable digital signal processing section 30 is set to process codec processes, such as convolutional coding, turbo coding, and decoding supporting the coding, modem processes, such as a modem process supporting the QPSK modulation scheme, multiplexing processes, such as code division multiplexing using a direct sequence spread spectrum and a demultiplexing process corresponding thereto, a synchronization process, such as a process of synchronizing a scramble code or a synchronizing channel supporting the WCDMA standard, and a filtering process, such as a transmission and reception filtering process satisfying root Nyquist characteristics.

When wireless communication is performed between wireless communication apparatus 10 and another wireless communication apparatus, such as a base station of the WCDMA mobile telephone system, analog signal processing section 15 performs analog processes such as amplification with predetermined gain, frequency conversion and frequency selection, on digitally modulated signals received through an antenna, and analog-to-digital converting section 20 quantizes the analog processed signals to generate a digital data sequence and outputs the digital data sequence to reconfigurable digital signal processing section 30. In reconfigurable digital signal processing section 30, the digital data sequence is inputted to reconfigurable signal processing module 40 through I/O section 35, and reconfigurable signal processing module 40 performs predetermined demodulation and decoding processing supporting the WCDMA scheme on the received digital data sequence. The bit data sequence finally obtained is temporarily stored in general-purpose memory 55 through I/O section 50, and then read from the memory through bus 60 in order for processing in subsequent upper-layer such as the application layer.

When wireless communication apparatus 10 performs a receiving process, a WCDMA downlink signal is synchronized, and only data required for a subsequent receiving process is selected at the synchronization timing and then outputted to the next processing system. In addition, timing information related to the WCDMA scheme is supplied to timer 75. Timer 75 starts the timer operation in synchronization with the system timing, based on this system timing information. To be more specific, timer 75 includes a counter that performs a counting operation in synchronization with the frame timing of the system.

In contrast, when wireless communication apparatus 10 needs to transmit uplink signals to the base station and a transmission bit data sequence is temporarily accumulated in memory 55 through bus 60, communication control section 70 determines the start timing of the uplink transmission process based on the system timing information from timer 75, and transmits transmission start timing information to timer 75.

To be more specific, this is equivalent to writing the counter value which shows the transmission start timing. If the count value matches with the transmission start timing, timer 75 transmits a transmission process start enable signal, to I/O section 50. When receiving the transmission process start enable signal, I/O section 50 sequentially reads the transmission bit data sequence that is temporarily stored in general-purpose memory 55, and supplies the read data to reconfigurable signal processing module 40. Reconfigurable signal processing module 40 performs predetermined transmission signal processing supporting the uplink transmission process of the WCDMA scheme. The obtained transmission digital modulated signal is transmitted to analog-to-digital converting section 20 through I/O section 35, and then converted into an analog signal by analog-to-digital converting section 20. Then, analog signal processing section 15 performs predetermined analog processes, such as predetermined band limiting, frequency conversion, and amplification on the analog signal, and the processed analog signal is by wireless transmitted to the base station through the antenna.

When the communication process function of wireless communication apparatus 10 is switched from the WCDMA scheme to the IEEE802.11a scheme, wireless communication apparatus 10 operates as follows. That is, reconfiguration control section 85 reads, from reconfiguration memory 80, software programs or configuration parameters for setting the process function of reconfigurable signal processing module 40 to a predetermined function supporting theIEEE802.11a scheme, and supplies the read data to reconfigurable signal processing module 40 through reconfiguration control bus 65. In this way, the function of the signal processing module is changed.

For example, as the codec processes, convolutional coding and Viterbi decoding corresponding thereto are set. As the primary modem processes, any one of BPSK, QPSK, 16QAM, and 64QAM and a modulating and demodulating process corresponding thereto are set. As the multiplexing process, an OFDM (orthogonal frequency division multiplexing) process is set. As the synchronization process, a synchronization process using a short training symbol or a long training symbol supporting the IEEE802.11a scheme is set. As the filtering process, a transmission filtering process satisfying the transmission spectrum requirement of the IEEE802.11a scheme, or a reception filtering process for canceling noise is set.

When wireless communication is performed between wireless communication apparatus 10 and another wireless communication apparatus, such as a wireless LAN station, according to the IEEE802.11a scheme, analog signal processing section 15 performs analog processes, such as predetermined amplification, frequency conversion, and frequency selection, on an OFDM digital modulated signal that is received through the antenna, and analog-to-digital converting section 20 quantizes the result into a digital signal, and outputs the resulting digital data sequence to reconfigurable digital signal processing section 30. In reconfigurable digital signal processing section 30, the digital data sequence is inputted to reconfigurable signal processing module 40 through I/O section 35, and reconfigurable signal processing module 40 performs predetermined demodulating and decoding process supporting the IEEE802.11a scheme on the received digital data sequence. The received bit data sequence finally obtained is temporarily stored in general-purpose memory 55 through I/O section 50, and then read from the memory through bus 60 to be used in processing in subsequent upper-layers such as the application layer. When wireless communication apparatus 10 performs this receiving process, wireless communication apparatus 10 performs a synchronization process on signals received from the communicating station according to the IEEE802.11a scheme, to obtain information about the timing, and the information about the timing is provided to timer 75.

When wireless communication apparatus 10 transmits an ACK signal or data to the communicating station, communication control section 70 determines transmission timing based on the timing information set in timer 75 and a predetermined regulation of a MAC layer, and transmission signal processing supporting the IEEE802.11a scheme is performed based on the same control operation as in the transmission process supporting the WCDMA scheme.

In this way, wireless communication apparatus 10 performs a wireless communication processes supporting one of the WCDMA scheme and the IEEE802.11a scheme. In this case, in reconfigurable digital signal processing section 30, when signal processing related to the transmission and reception of signals is performed, the processing delay time between the input timing of transmission bit data and the output timing of a transmission digital modulated signal from the final stage occurs due to, for example, buffering delay caused by a latch process, a pipeline process or serial/parallel conversion. In addition, in analog signal processing section 15 or analog-to-digital converting section 20, when the function thereof is changed to support the wireless communication scheme of the WCDMA scheme or the IEEE802.11a scheme, analog signal processing characteristics are changed, or a processing system is switched, and, with this, the delay time between the input and the output is likely to change.

Therefore, in order for wireless communication apparatus 10 to perform wireless transmission at the transmission timing that is prescribed by the wireless communication standard, as described above, it is necessary to correct the process start timing taking into account the processing delay time occurring in each of reconfigurable digital signal processing section 30, analog signal processing section 15, and analog-to-digital converting section 20.

To be more specific, it is necessary to advance the start timing of transmission signal processing in reconfigurable digital signal processing section 30 by a time corresponding to the processing delay time. In order to advance the transmission timing, the following method can be used: a processing delay time occurring in each processing section can be estimated in advance in the shipping stage, and the estimated processing delay time is stored semi-fixedly in communication control section 70; and when determining the actual start timing of a transmission process, wireless communication apparatus 10 sets the value of timer 75 such that a transmission process enable signal is outputted at the timing the processing delay time earlier than the original transmission timing.

When wireless communication apparatus 10 changes its wireless communication function, the processing delay time occurring in each processing section is likely to change. Therefore, the processing delay time may vary between supporting wireless communication schemes. In this case, it is possible to perform wireless communication satisfying the requirement with respect to wireless transmission timing by estimating and storing the amount of processing delay occurring in each processing section when the function thereof is set to supporting wireless communication schemes in the shipping stage, reading the amount of processing delay corresponding to the current wireless communication function every time transmission control is performed, and correcting the transmission timing corresponding to the delay amount.

In addition to the timing correction during the transmission process, other communication control factors may need to be corrected when the function of wireless communication apparatus 10 is changed. For example, system synchronization timing may need to be corrected based on a processing delay time when the wireless communication apparatus performs a receiving process. In addition, when received power is measured, the measured value may need to be corrected according to the difference between gains set in the processing sections.

Patent Document 1: Japanese Patent No. 3348196
Patent Document 2: Japanese Patent Application Laid-Open No. 2002-335186

DISCLOSURE OF INVENTION

Problems to be Solved by the Invention

However, in the conventional wireless communication apparatus, the processing delay time supporting the wireless communication schemes are stored semi-fixedly in the communication control section in the shipping stage in advance. Therefore, when it is necessary to change the algorithm in the signal processing section in order to change the specifications of a communication standard or improve the function and performance of the communication apparatus, the following problems arise. That is, when the processing delay time occurring in transmission signal processing is changed due to variations in the algorithm of the signal processing section, it is necessary to estimate the correction value that has already been estimated for communication control again and change the stored content. In addition, in order not to change the correction value, it is necessary to design the algorithm such that the process is performed with the same delay time, and there are restrictions in designing the algorithm. As a result, additional load is created in terms of efficiency of development.

Further, configuration is considered such that, as shown in FIG. 2, reconfigurable signal processing module 40 of wireless communication apparatus 10 is divided into a plurality of signal processing blocks. In the case, the above-mentioned problems become remarkable. That is, for example, it is considered that, among a series of communication processes supporting a certain communication scheme, only a processing algorithm of reconfigurable function module 45b supporting the modem process may need to be changed when there is a minor change in a wireless communication standard. In addition, it may be considered that two kinds of algorithms, that is, an algorithm requiring high performance and a large amount of computation and an algorithm requiring relatively low performance and a small amount of computation, are switched to support a certain communication system, according to the state of wireless communication apparatus 10.

In this case, when a processing delay time is changed by the algorithm of a corresponding function module, the processing delay time of each function module should be estimated and stored in advance, or the algorithm should be designed without changing the processing delay time. When the processing delay time is estimated in advance and then stored semi-fixedly, it is difficult to change the algorithm of the function module after the shipment of wireless communication apparatus 10. In addition, when the algorithm is designed without changing the specification of processing delay time, there are restrictions in designing the algorithm, which results in decreased development efficiency.

These problems also arise when the system synchronization timing is corrected or when the measured value of received power is corrected according to the difference between the gains of the processing section.

Further, communication quality is likely to deteriorate when the algorithm of a signal processing section is changed in order to change the specifications of a communication standard or improve the function and performance, resulting in a change in the processing delay time, and when communication is performed without any correction.

It is therefore an object of the present invention to provide a wireless communication apparatus and a communication control method capable of performing appropriate correction to improve communication quality even when communication control information changes accompanying function changes.

Means for Solving the Problem

According to the present invention, a wireless communication apparatus includes: a plurality of reconfigurable function sections that enable digital signal processing supporting a plurality of communication schemes by reconfiguring functions related to communications; and a communication operation control function section that controls communication operations, wherein: the reconfigurable function sections each include a property register that holds communication control information; and the communication control section includes: a reconfiguration control section that overwrites the communication control information in the property registers every time a communication function is reconfigured; and a communication control section that performs communication control based on the communication control information held in the property registers.

Advantageous Effect of the Invention

According to the present invention, it is possible to provide a wireless communication apparatus and a communication control method capable of performing appropriate correction to improve communication quality even when communication control information changes accompanying function changes.

BRIEF DESCRIPTION OF DRAWINGS

FIG. 7 shows another example of the configuration of the property register according to Embodiment 1 of the invention;

BEST MODE FOR CARRYING OUT THE INVENTION

Figure 1:
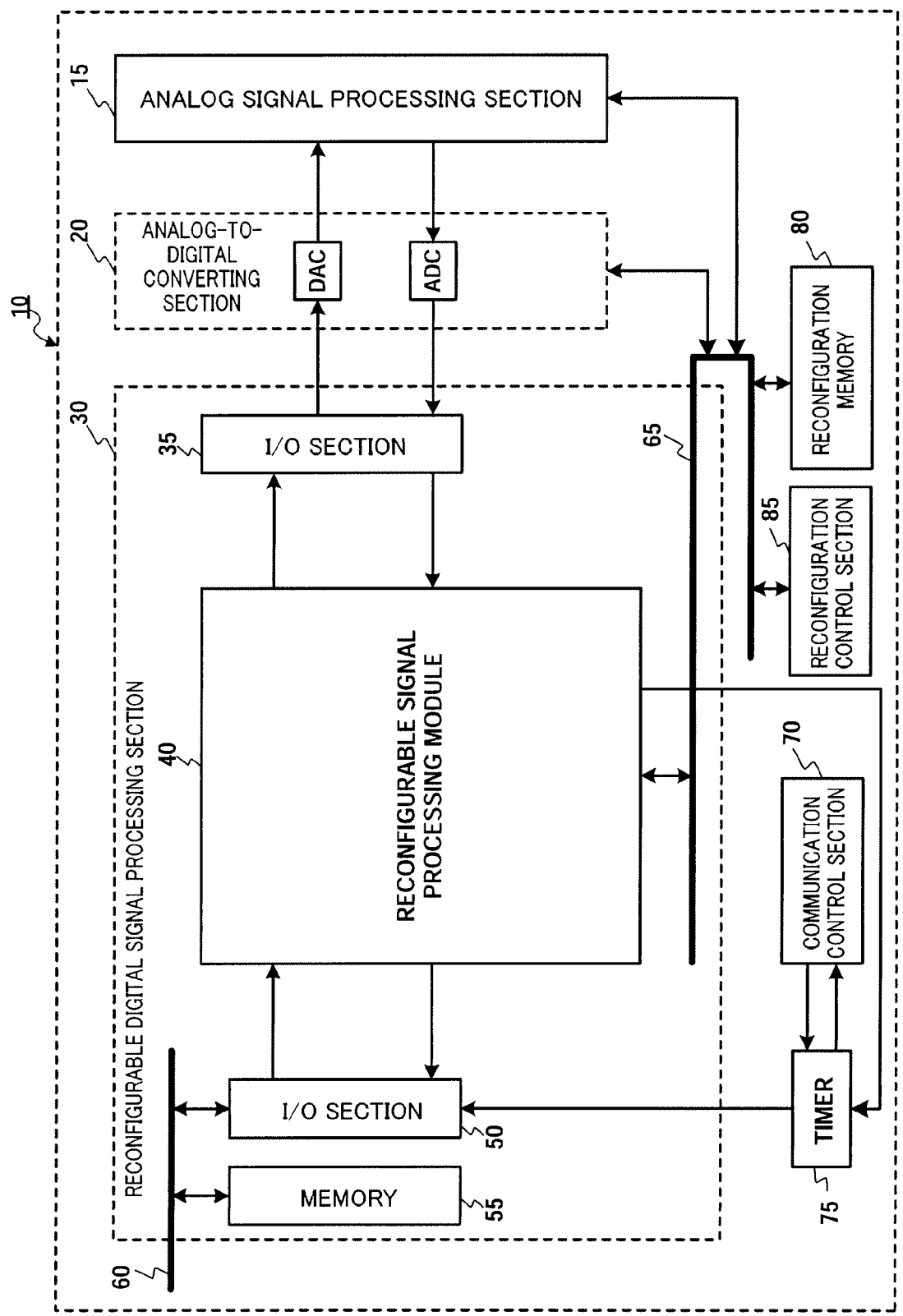
FIG. 1 shows an example of the configuration of a conventional wireless communication apparatus that can change its function.
Figure 2:
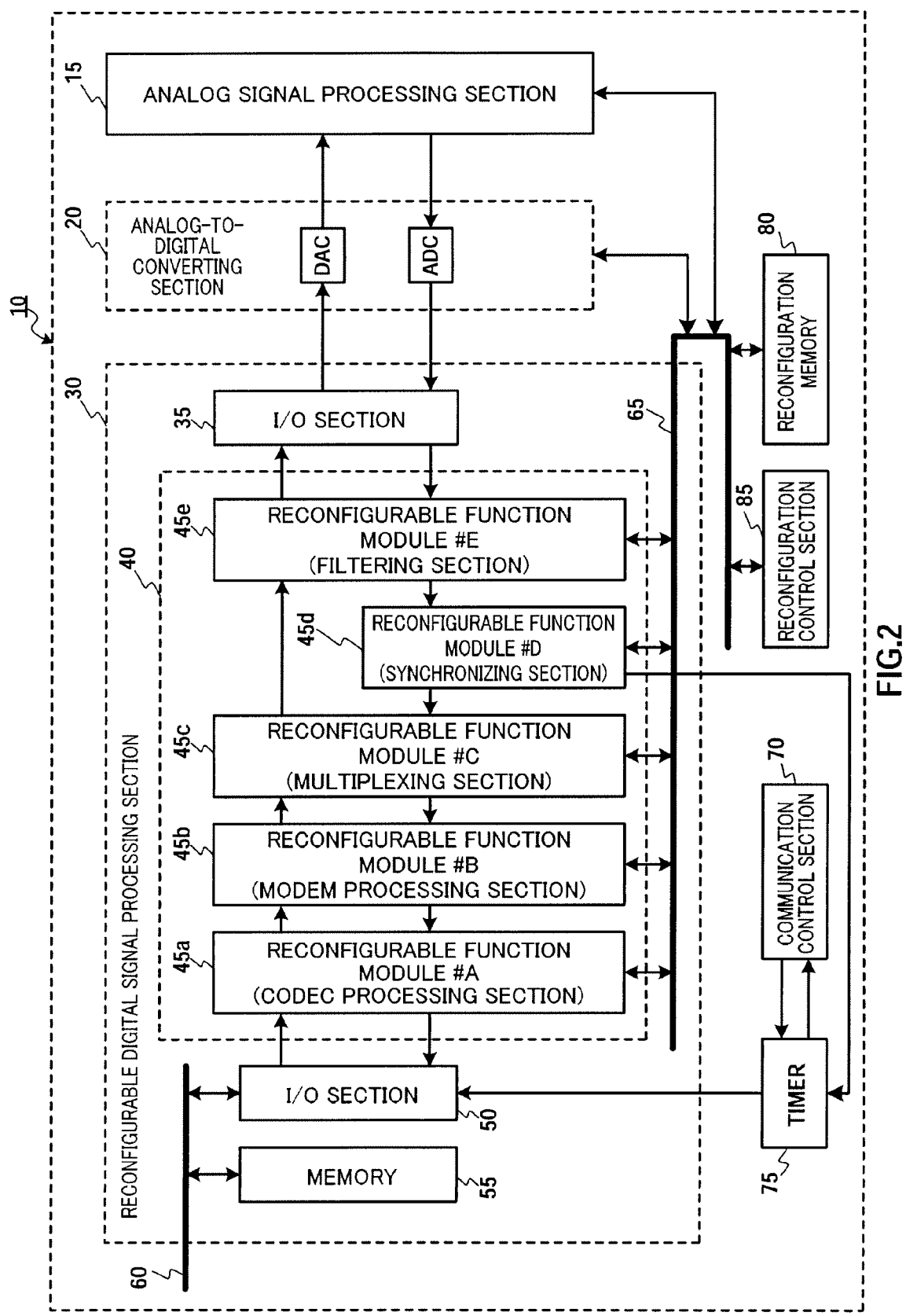
FIG. 2 shows another example of the configuration of the conventional wireless communication apparatus that can change its function.

Embodiments of the invention will be described in detail with reference to the accompanying drawings. In the following embodiments, the same components are assigned the same reference numerals without repeating overlapping descriptions.

(Embodiment 1)

In this embodiment, information about the delay time between the input and the output of each function module can be provided as one property relating to the function and performance of each function module, and the information is used for transmission timing control. Embodiment 1 will be described in detail with reference to FIGS. 3 to 7.

Figure 3:
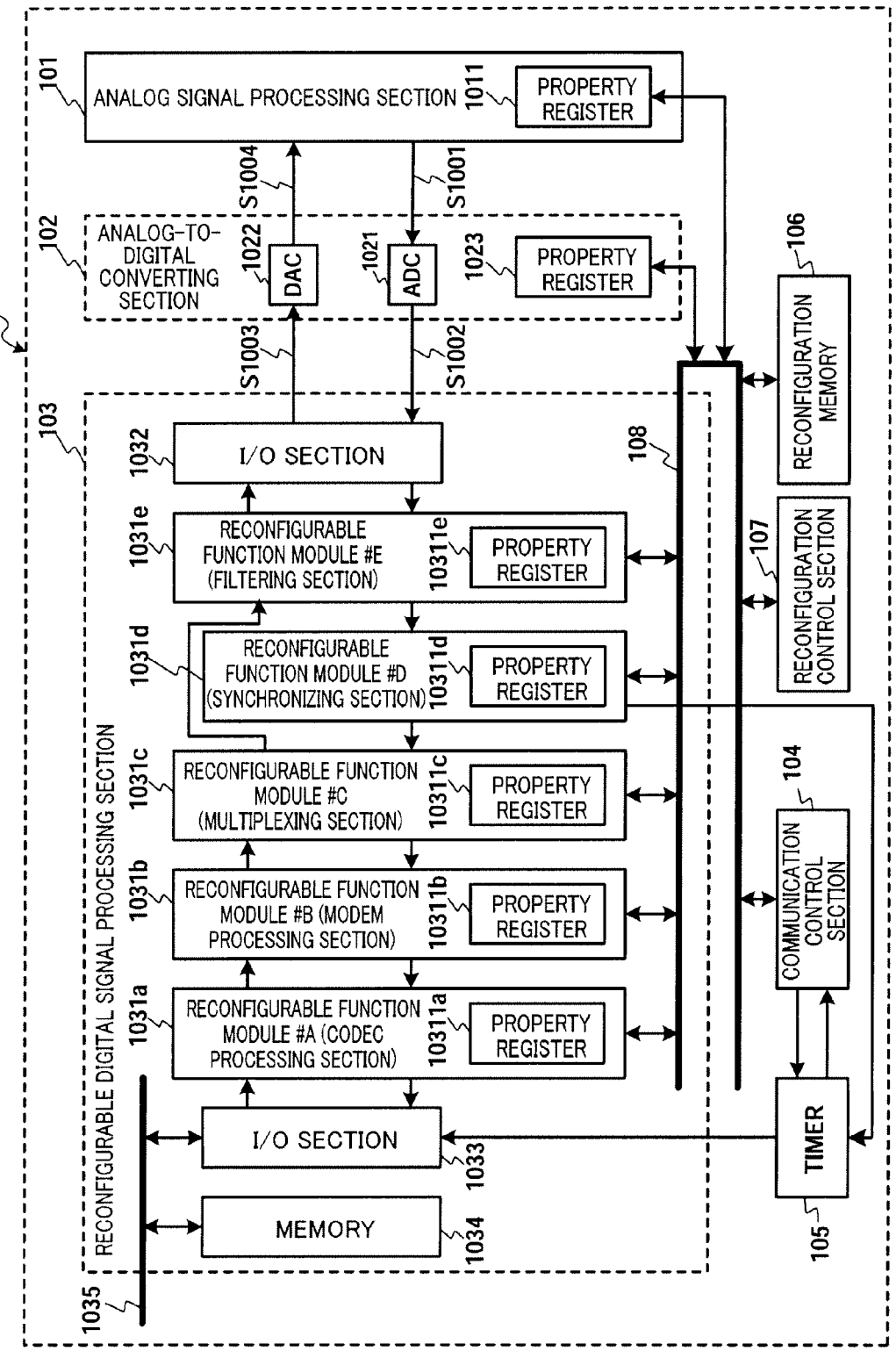
FIG. 3 shows an example of the configuration of a wireless communication apparatus according to an Embodiment 1 of the invention.

In FIG. 3, wireless communication apparatus 100 performs wireless communication with other wireless communication apparatuses, and the function and performance thereof can be dynamically changed. Wireless communication apparatus 100 includes at least analog signal processing section 101, analog-to-digital converting section 102, reconfigurable digital signal processing section 103, communication control section 104, timer 105, reconfiguration memory 106, and reconfiguration control section 107.

Analog signal processing section 101 processes all analog signals that are by wireless transmitted and received by wireless communication apparatus 100. To be more specific, analog signal processing section 101 receives radio signals by wireless transmitted in a desired frequency band through an antenna, and performs predetermined filtering, amplification and frequency conversion, on the received RF analog signals. In addition, analog signal processing section 101 outputs the received analog signal S1001 to analog-to-digital converting section 102, and performs processes, such as frequency conversion into a desired frequency band, amplification, and filtering, on a transmission analog signal S1004 transmitted from analog-to-digital converting section 102. Further, analog signal processing section 101 by wireless transmits the obtained transmission RF analog signal through the antenna. Analog signal processing section 101 includes, for example, an antenna, a frequency converting section, a filter, and an amplifying section.

Analog-to-digital converting section 102 quantizes the received analog signal S1001 transmitted from analog signal processing section 101 into a predetermined number of quantization bits at a predetermined sampling rate, and outputs the quantized signal as a received digital signal S1002 to reconfigurable digital signal processing section 103. In addition, analog-to-digital converting section 102 converts a transmission digital signal S1003 transmitted from reconfigurable digital signal processing section 103 into an analog signal in a predetermined resolution at a predetermined sampling rate, and outputs the converted signal to analog signal processing section 101 as the transmission analog signal S1004. In this case, in analog-to-digital converting section 102, known analog-to-digital converting circuit 1021 can be used to convert the analog signal into the digital signal, and known digital-to-analog converting circuit 1022 can be used to convert the digital signal into the analog signal.

Reconfigurable digital signal processing section 103 processes digital signals used in a wireless communication process performed by wireless communication apparatus 100. More specifically, reconfigurable digital signal processing section 103 performs receiving processes including a demodulating process and a decoding supporting the desired communication system on the received digital signal S1002 that is provided from analog-to-digital converting section 102, and outputs the obtained reception data sequence to a host processing section of wireless communication apparatus 100. Meanwhile, reconfigurable digital signal processing section 103 performs transmission processes including an encoding or a modulating process supporting the desired communication system on a transmission data sequence transmitted from a host section, and outputs the obtained transmission digital signal S1003 to analog-to-digital converting section 102. In addition, reconfigurable digital signal processing section 103 includes a plurality of function sections (function modules) for performing the transmitting and receiving processes, and the function and performance of each function module can be dynamically changed. In this embodiment, reconfigurable digital signal processing section 103 includes, for example, a plurality of reconfigurable function modules 1031, I/O sections 1032 and 1033, a general-purpose memory 1034, and bus 1035.

Reconfigurable function module 1031 performs digital signal processing required for a desired transmitting or receiving process on an input digital signal, and outputs the processed signal. In addition, reconfigurable function module 1031 can be reconfigured under the control of reconfiguration control section 107 through reconfiguration control bus 108 such that its digital signal processing function or performance can be changed. In this embodiment, as an example of the configuration of a plurality of reconfigurable function modules 1031, the configuration of five cascade-connected independent function modules is described. Reference numerals 1031*a*, 1031*b*, 1031*c*, 1031*d*, and 1031*e* denote respective function modules. In addition, in this embodiment, similar to the example described in the description of the background art, it is assumed that the function or performance of reconfigurable function module 1031 can be changed so as to support the WCDMA scheme and the IEEE802.11a scheme.

Reconfigurable function module 1031*a* performs a desired channel encoding or a desired channel decoding on an input digital signal, and outputs the processed signal. In addition, the function or performance of reconfigurable function module 1031*a* can be changed under the control of reconfiguration control section 107 through reconfiguration control bus 108. In this embodiment, it is assumed that the function or performance of reconfigurable function module 1031*a* can be changed to support the WCDMA scheme and the IEEE802.11a scheme. To be more specific, the function of reconfigurable function module 1031*a* can be changed to a channel coding supporting the WCDMA scheme, which includes convolutional coding with a constraint length of K=9 and a coding rate of R=½ or ⅓, turbo coding having a coding rate of R=⅓, a predetermined interleave process, and an outer coding for detecting errors, and a decoding supporting the coding. In addition, the function of reconfigurable function module 1031*a* can be changed to a channel coding supporting the IEEE802.11a scheme, which includes a punctured convolutional coding having a constraint length of K=7 and a coding rate of ½ to ¾ and a predetermined interleave process, and decoding supporting the coding.

Reconfigurable function module 1031*b* performs a desired modulating process or a desired demodulating process on an input digital signal, and outputs the processed signal. In addition, the function and performance of reconfigurable function module 1031*b* can be changed under the control of reconfiguration control section 107 through reconfiguration control bus 108. In this embodiment, it is assumed that the function and performance of reconfigurable function module 1031*b* can support the WCDMA scheme and the IEEE802.11a scheme. To be more specific, the function of reconfigurable function module 1031*b* can be changed to a modulating process supporting the WCDMA scheme, which include a QPSK modulating process and a demodulating process, and to modem processes supporting the IEEE802.11a scheme, which is any one of BPSK, QPSK, 16QAM, and 64QAM according to the operation mode.

Reconfigurable function module 1031c performs a desired multiplexing process or a desired demultiplexing process on an input digital signal, and outputs the processed signal. In addition, the function and performance of reconfigurable function module 1031c can be changed under the control of reconfiguration control section 107 through reconfiguration control bus 108. In this embodiment, it is assumed that the function and performance of reconfigurable function module 1031c can be changed to support the WCDMA scheme and the IEEE802.11a scheme. To be more specific, the function of reconfigurable function module 1031c can be changed to multiplexing and demultiplexing processes supporting the WCDMA scheme, which include a predetermined direct sequence spread spectrum process and a de-spread process, and to multiplexing and demultiplexing processes supporting the IEEE802.11a scheme, which include an orthogonal frequency division multiplexing process (hereinafter referred to as an OFDM modulation process) and an inverse conversion process thereof (hereinafter referred to as an OFDM demodulation process).

Reconfigurable function module 1031d performs a desired synchronization process on an input reception digital modulation signal, corrects a timing error and a frequency-domain error caused by the synchronization, if necessary, extracts only data required for the next process, and outputs the extracted data. In addition, the function and performance of reconfigurable function module 1031d can be changed under the control of reconfiguration control section 107 through reconfiguration control bus 108. In this embodiment, it is assumed that the function and performance of reconfigurable function module 1031d can be changed to support the WCDMA scheme and the IEEE802.11 system. To be more specific, the function of reconfigurable function module 1031d can be changed to synchronization processes supporting the WCDMA scheme, which include a process of synchronizing frame timing or a scramble code using SCH or CPICH and a process of correcting a time-domain error and a frequency-domain error caused by the synchronization process, and to synchronization processes supporting the IEEE820.11a system, which include a synchronization process using an STS (short training symbol) or an LTS (long training symbol) and a process of correcting a time-domain error and a frequency-domain error caused by the synchronization process.

Reconfigurable function module 1031e performs a desired filtering process on an input digital signal, and outputs the filtered signal. In addition, the function and performance of reconfigurable function module 1031e can be changed under the control of reconfiguration control section 107 through reconfiguration control bus 108. In this embodiment, it is assumed that the function and performance of reconfigurable function module 1031e can be changed to support the WCDMA scheme and the IEEE802.11a scheme. To be more specific, reconfigurable function module 1031e can be changed to filters supporting the WCDMA scheme and the IEEE802.11a scheme, which have the number of taps and a tap coefficient capable of realizing frequency response characteristics that are designed to satisfy desired transmission spectrum characteristics and receiver sensitivity characteristics.

In the transmission system, since the synchronization process is not needed, the output of reconfigurable function module 1031c performing a multiplexing process skips reconfigurable function module 1031d and is then inputted to reconfigurable function module 1031e performing a filtering process.

The configuration of each of the reconfigurable function modules is not particularly limited in the present invention. For example, the reconfigurable function modules may be formed in the following four configurations.

The first example is a configuration using devices that are programmable at logic levels, such as FPGA and CPLD. In this case, FPGA devices may be prepared in the sections of the reconfigurable function modules. Alternatively, all the reconfigurable function modules may be provided in one FPGA device, when the FPGA device is partially and independently reconfigurable in the inside thereof.

With the second example, a configuration may be formed using reconfigurable processors allowing a wide range of function changes and allowing flexible changes of the functions of a plurality of general-purpose arithmetic and logic units (ALUs) and the connection relationships between arithmetic units, compared to FPGA or CPLD.

For the third configuration, a plurality of kinds of driving circuits are prepared in advance and the driving circuit to connect is changed according to configuration parameters supplied, thereby changing the function and performance. For example, the filter processing section 1031e may be configured as follows: plural kinds of values of each filter tap coefficient are read out from a memory according to the setting of addresses, and the read address is used as a configuration parameter, thereby switching a plurality of frequency characteristics.

For the fourth example, a configuration may be formed with a central processing section (CPU) or a digital signal processor (DSP) whose function and performance can be changed by varying a program having software commands written therein.

As one characteristic of the present invention, each of reconfigurable function modules 1031 includes property register 10311 that stores property information related to the function or performance of the reconfigurable function module. The property information can be read out from property register 10311 through reconfiguration control bus 108, if necessary.

Figure 4:
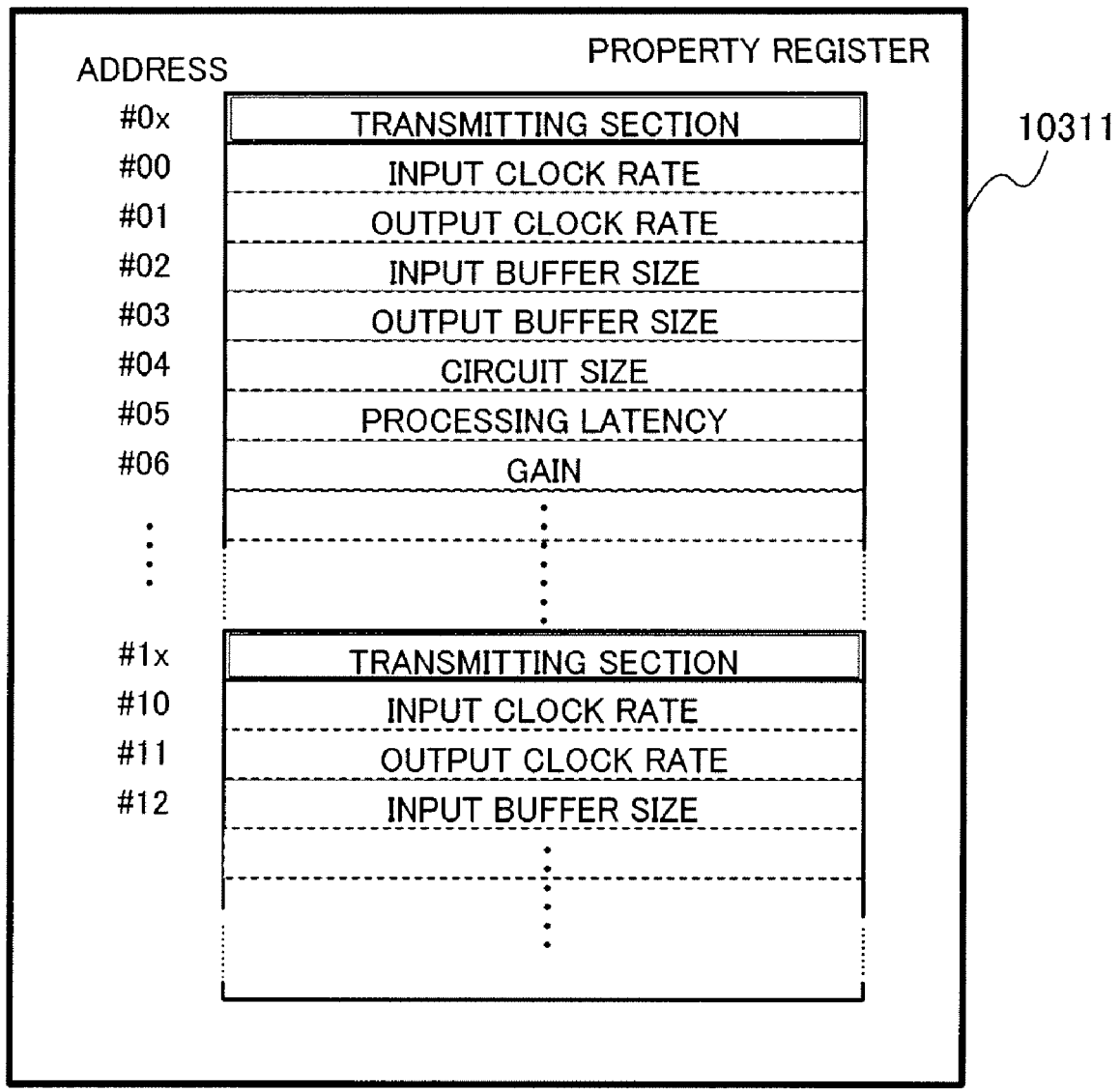
FIG. 4 shows an example of the configuration of a property register according to Embodiment 1 of the invention.

FIG. 4 shows an example of the configuration of property register 10311 according to this embodiment. Predetermined property information is stored in each address. In this embodiment, it is assumed that items of property information related to an input clock rate, the output clock rate, input buffer size, output buffer size, circuit size, processing latency, and gain are stored in the order of addresses. In this embodiment, among the items of property information, the item of property information related to the processing latency is used to perform communication control, which will be described later.

The term "processing latency" refers to the delay time from the input of data in the function module to the output of data after a predetermined process, and includes latency caused by the hardware configuration of the function module and latency caused by the algorithm in the function module. In general, the term "processing latency" refers to the total of delay times caused in the pipeline process, data latch process, etc., in the digital signal processing of the function module. In this embodiment, the time length of the processing latency is represented by the number of clocks with respect to the operation clocks of each function module.

I/O section 1032 outputs the transmission digital modulation signal generated by reconfigurable function module 1031 to digital-to-analog converting circuit 1022, and outputs the reception digital modulation signal transmitted from the analog-to-digital converting circuit 1021 to reconfigurable function module 1031. I/O section 1033 writes the decoded data sequence outputted from reconfigurable function module 1031 in memory 1034 through bus 1035. In addition, I/O section 1033 reads out the transmission data sequence that is temporarily stored in memory 1034 through bus 1035 based on a transmission process enable signal transmitted from timer 105 and outputs the read data to reconfigurable function module 1031.

Memory 1034 temporarily stores data transmitted between a signal processing section related to a physical layer and processing sections for layers above the MAC layer in reconfigurable function module 1031.

Bus 1035 is connected to memory 1034 and I/O section 1033. Although not shown in FIG. 3, bus 1035 is connected to processing devices for the layers above the MAC layer.

Communication control section 104 controls a wireless communication operation of wireless communication apparatus 100. For example, communication control section 104 controls at least wireless communication timing, and is connected to at least reconfiguration control bus 108 and timer 105. The transmission timing is controlled based on communication control information that is stored in each of property registers 10311. Since other communication control operations have no influence upon this embodiment, details thereof will not be described.

Figure 5:
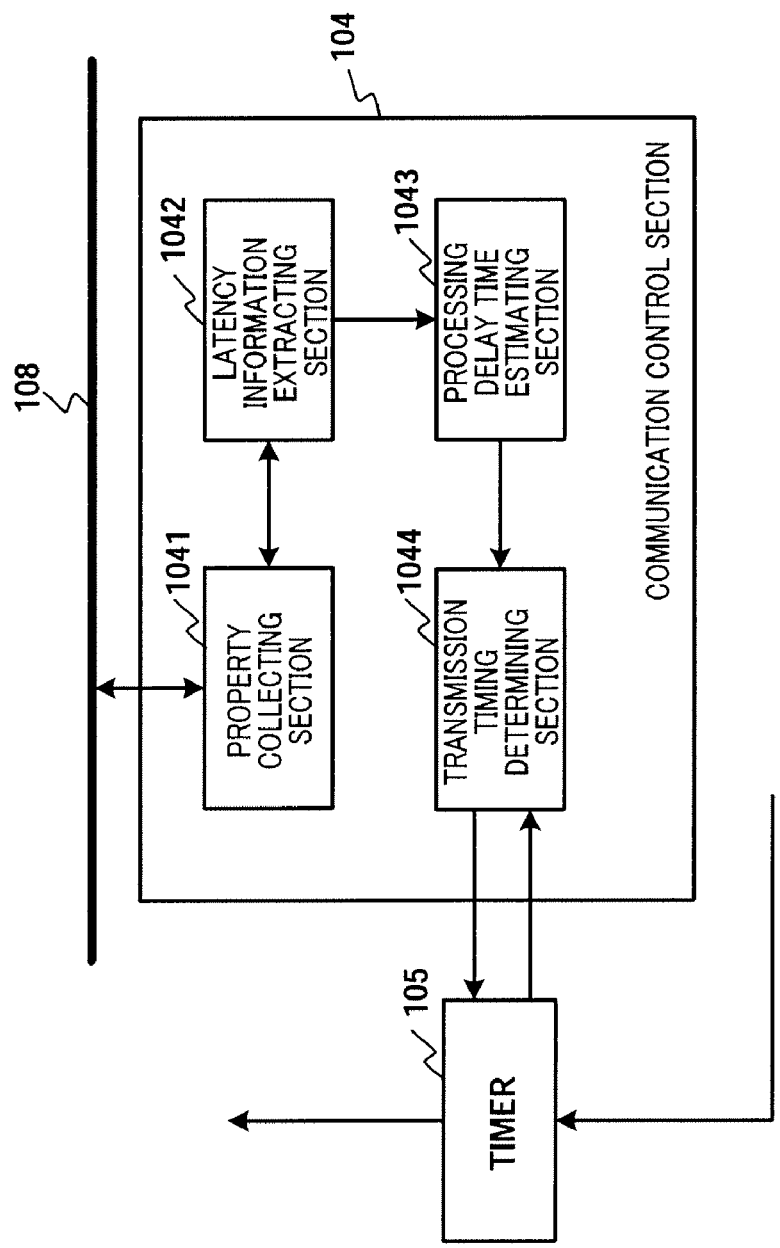
FIG. 5 shows an example of the configuration of a communication control section according to Embodiment 1 of the invention.

FIG. 5 shows an example of the configuration of communication control section 104 according to this embodiment. Communication control section 104 includes property collecting section 1041, latency information extracting section 1042, processing delay time estimating section 1043, and transmission timing determining section 1044.

Property collecting section 1041 is connected to reconfiguration control bus 108 and reads out properties related to the functions and performances of reconfigurable function modules 1031 stored in property registers 10311 of reconfigurable function modules 1031 through the bus 108.

Latency information extracting section 1042 extracts information about processing latency from the property information of each function module that is collected by property collecting section 1041, and outputs the extracted information.

Processing delay time estimating section 1043 uses the information related to the processing latency of each of reconfigurable function modules 1031 that is outputted from latency information extracting section 1042 to estimate the total processing delay time of the transmission digital signal processing system. The operation of processing delay time estimating section 1043 will be described in detail below.

Transmission timing determining section 1044 outputs information about the start timing of a wireless signal transmission process, based on system timing information transmitted from timer 105 and the processing delay time estimated by processing delay time estimating section 1043. The operation of transmission timing determining section 1044 will be described in detail below.

Timer 105 outputs a transmission process enable signal for starting an operation of processing a transmission digital signal in reconfigurable digital signal processing section 103. For example, timer 105 may be composed of a programmable counter. The transmission process enable signal is determined based on information about the start timing of transmission signal processing that is outputted from transmission timing determining section 1044, which will be described in detail below.

Reconfiguration memory 106 stores, for example, processing programs, setting data, and parameters required to set or change the processing functions of the plurality of reconfigurable function modules 1031. Desired processing programs, setting data, and parameters are read from reconfiguration memory 106, and then transmitted to a target function module through reconfiguration control bus 108, under the control of reconfiguration control section 107. For example, reconfiguration memory 106 may be composed of a non-volatile memory, such as a flash ROM or an EEPROM, a magnetic memory device, such as a hard disk, or a storage device using an optical disk, such as a CD or a DVD. In addition, program software and function configuration parameters stored in these memory sections do not fall within the scope of the invention and are not particularly limited.

Reconfiguration control section 107 controls changes in the functions of the plurality of reconfigurable function modules 1031, and is connected to reconfiguration control bus 108. Reconfiguration control section 107 reads out, for example, the processing programs, the setting data, the parameters stored in reconfiguration memory 106, and controls the transmission of data to a predetermined reconfigurable function module. Further, with the present invention, any method can be used to transmit data. However, for example, it is assumed that a DMA (direct memory access) method is used to transmit data.

Reconfiguration control section 107 writes property information in property registers 10311 every time reconfigurable function modules 1031 are reconfigured. In this embodiment, reconfiguration control section 107 overwrites the previous property information in property registers 10311 every time reconfigurable function modules 1031 are reconfigured.

Reconfiguration control bus 108 is a bus connection line for transmitting data among the plurality of reconfigurable function modules 1031, reconfiguration memory 106, reconfiguration control section 107 and communication control section 104. In the invention, detailed specifications, such as a bus width and the number of bus lines, are not particularly limited, but the address buses and the bus are connected to access points.

Figure 6:
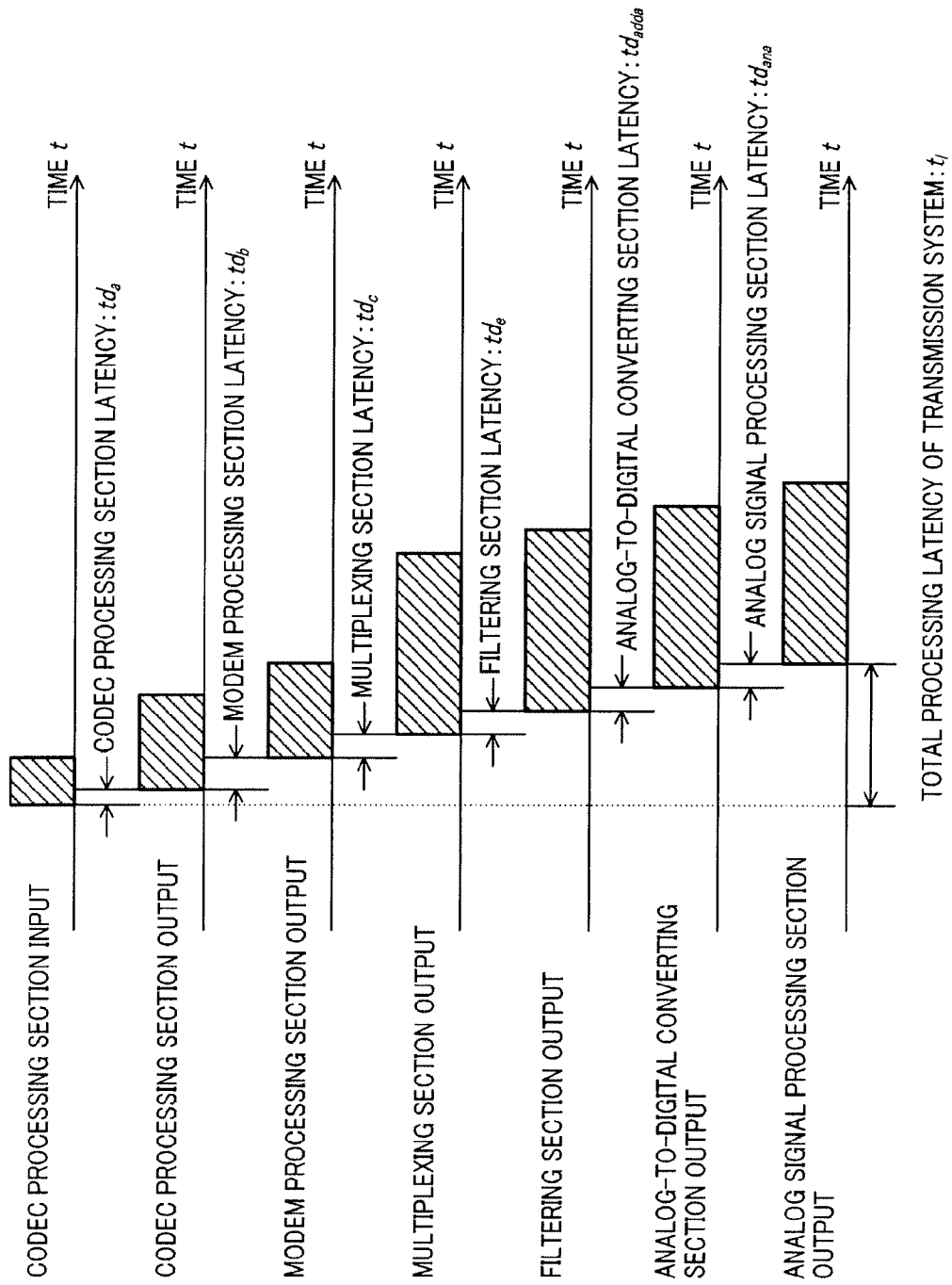
FIG. 6 shows an example of the transmission process timing of each processing section of the wireless communication apparatus according to Embodiment 1 of the invention.

FIG. 6 shows latencies generated from the processing sections when wireless communication apparatus 100 performs a transmission process. In this embodiment, it is assumed that, when reconfigurable digital signal processing section 103 of wireless communication apparatus 100 performs the transmission process, data is inputted or outputted to or from a plurality of reconfigurable function modules 1031 at the timing shown in FIG. 6, and process latencies are generated.

That is, it is assumed that, during the input or output of data to or from the function modules, the length of input or output data varies according to predetermined signal processing specifications, and process latencies $td_a$, $td_b$, $td_c$, and $td_e$ occur in reconfigurable function modules 1031a, 1031b, 1031c, and 1031e, respectively. Further, it is assumed that, in property registers 10311 of the function modules, values $n_a$, $n_b$, $n_c$, and $n_e$ obtained by converting the process latencies into the number of clocks of the operation clock frequency $f_{clk}$ are held in address #5 where property information related to the latency is held.

It is assumed that delay times $td_{adda}$ and $td_{ana}$ are generated between the input and output of analog-to-digital converting section 102 and between the input and output of analog signal processing section 101, respectively. In addition, it is assumed that, in property registers 1023 and 1011 of the processing sections, values $n_{adda}$ and $n_{ana}$ obtained by converting the delay times into the number of clocks of the operation clock frequency $f_{clk}$ are held in address #5 where property information related to latency is held. In addition, for simplicity of explanation, it is assumed that the reconfigurable function modules are operated at the same operation clock frequency.

In wireless communication apparatus 100 having the above-mentioned configuration, information about the processing delay time between the input and output of each function module forming a transmission system can be provided as one property related to the functions and performances of the function modules, and the information can be used to correct the timing of the transmission process. This operation will be described below.

First, the operation of wireless communication apparatus 100 when serving as a WCDMA communication system to perform an uplink transmission process will be described below.

Each of reconfigurable function modules 1031 of reconfigurable digital signal processing section 103 reads, for example, processing programs, setting data, and parameters supporting the WCDMA scheme from reconfiguration memory 106 through reconfiguration control bus 108. In addition, property information related to the set function and performance is held in property register 10311 of each function module.

First, reconfigurable digital signal processing section 103 performs a synchronization process using SCH or CPICH, which is a channel for synchronizing the system, to connect with the WCDMA system. In this case, when the system synchronization is established, reconfigurable function module 1031d performing the synchronization process transmits system timing information to timer 105. To be more specific, for example, at the timing, which is a reference for a frame period, a counter value is reset, and the counter is set to operate in synchronization with the frame period.

When wireless communication apparatus 100 needs to perform uplink transmission, communication control section 104 determines uplink transmission timing, based on the downlink frame timing shown by timer 105, and transmits information about the start timing of transmission signal processing to timer 105. The term "information about the start timing of transmission signal processing" may be shown by, for example, the count vale of timer 105.

To be more specific, when analog signal processing section 101, analog-to-digital converting section 102, and reconfigurable function modules 1031 of reconfigurable digital signal processing section 103 in wireless communication apparatus 100 are completely reconfigured, property collecting section 1041 of communication control section 104 collects property information written in the property registers of the processing sections and the function modules through reconfiguration control bus 108, and holds the collected property information.

Latency information extracting section 1042 collects information about the latencies of the processing sections and the function modules, among various items of property information held in property collecting section 1041, and holds the collected information. That is, among the items of property information held in the property registers of the processing sections and the function modules in the format shown in FIG. 4, information about the processing latency held in address #05 is selectively read and held.

Processing delay time estimating section 1043 estimates the total processing delay time of the transmission process in wireless communication apparatus 100 using the information about the process latencies of the processing sections and the function modules collected by latency information extracting section 1042. To be more specific, reconfigurable digital signal processing section 103 estimates the latencies $n_a$, $n_b$, $n_c$, $n_d$, and $n_e$ of reconfigurable function modules 1031 and the latency $n_{adda}$ of analog-to-digital converting section 102. Analog signal processing section 101 estimates the time $t_1$ required for the transmission signal process from the latency $n_{ana}$ using the following equation 1.

[1]

$$t_1 = (td_a + td_b + td_c + td_e + td_{adda} + td_{ana}) \quad \text{(Equation 1)}$$
$$= (n_a + n_b + n_c + n_d + n_e + n_{adda} + n_{ana}) \times (1/f_{clk})$$

When receiving a transmission request signal from a host processing section, transmission timing determining section 1044 determines uplink transmission timing based on the system timing set by timer 105, and determines the timing obtained by subtracting, from the uplink transmission timing, the time corresponding to the total of transmission delay time $t_1$ in the digital transmission signal processing of reconfigurable digital signal processing section 103 as the start timing of the transmission signal processing of reconfigurable digital signal processing section 103. Then, transmission timing determining section 1044 transmits a timer value corresponding to the start timing to timer 105.

Timer 105 transmits the transmission process enable signal to I/O section 1033 at the timing when the count value of the timer is matched with a value corresponding to the start timing of the transmission signal processing that is transmitted from transmission timing determining section 1044. I/O section 1033 starts uplink transmission signal processing based on the transmission process enable signal.

When the transmission signal processing starts, as shown in FIG. 6, reconfigurable function modules 1031a, 1031b, 1031c, and 1031e perform signal processing required for transmission while generating the process latencies $td_a$, $td_b$, $td_c$, and $td_e$, respectively, and the latency $td_{adda}$ is generated from analog-to-digital converting section 102. In addition, the latency $td_{ana}$ is generated from analog signal processing section 101 during the process of converting a digital signal into a transmission RF signal. Finally, wireless communication apparatus 100 starts wireless uplink transmission at a timing $t_{tx}$ delayed from the original timing of the WCDMA scheme.

Next, the operation of wireless communication apparatus 100 changing a wireless communication system from the WCDMA system to the IEEE802.11a system to perform communication will be described below.

When wireless communication apparatus 100 needs to switch a wireless communication scheme from the WCDMA scheme to the IEEE802.11a scheme, reconfiguration control section 107 reads out, from reconfiguration memory 106, processing programs, setting data, and parameters of analog signal processing section 101, analog-to-digital converting section 102, and reconfigurable function modules 1031 of reconfigurable digital signal processing section 103 supporting the IEEE802.11a scheme, and then performs function change. For example, in the WCDMA scheme, the function of reconfigurable function module 1031c performing the multiplexing process is set to perform a direct sequence spread spectrum process and a de-spread process. However, when the wireless communication scheme is changed so as to support the IEEE802.11a scheme, the function of reconfigurable Function module 1031c is changed to perform an OFDM process including FFT/IFFT processes.

Further, the reconfiguration control is performed to newly write properties related to the functions and performances of the processing sections and the reconfigurable function modules changed to support the IEEE802.11a scheme in property registers 10311.

When the processing sections and the function modules are completely reconfigured, property collecting section 1041 of communication control section 104 collects various items of property information written in the property registers of the processing sections and the function modules through reconfiguration control bus 108, and holds the collected items of information. Latency information extracting section 1042 collects information about the transmission processing latency held in address #05, among the held various items of property information.

In this embodiment, when the communication function of wireless communication apparatus 100 is changed from the WCDMA scheme to the IEEE802.11a scheme, the transmission process latencies of reconfigurable function module 1031a, 1031b, 1031c, and 1031e, analog-to-digital converting section 102, and analog signal processing section 101 are changed to process latencies $td_a'$, $td_b'$, $td_c'$, $td_e'$, $td_{adda}'$, and $td_{ana}'$, respectively. Therefore, values $n_a'$, $n_b'$, $n_c'$, $n_e'$, $n_{adda}'$, and $n_{ana}'$ obtained by converting the latencies into the number of clocks are extracted from the collected property information and then held.

Processing delay time estimating section 1043 can calculate a delay time $t_1'$ caused by a series of transmission signal processing when wireless communication apparatus 100 performs a transmission process, based on collected latency information, using the following equation 2, which is similar to equation 1.

[2]

$$t_{1'} = (td_a' + td_b' + td_c' + td_e' + td_{adda}' + td_{ana}')$$
$$= (n_a' + n_b' + n_c' + n_e' + n_{adda}' + n_{ana}') \times (1/f_{clk})$$

(Equation 2)

Therefore, when a transmission process supporting the IEEE802.11a scheme is performed, transmission timing determining section 1044 may use the delay time $t_1'$ calculated by equation 2 to correct the transmission timing, and set a predetermined transmission start timing in timer 105.

Next, in a wireless LAN communication standard including the IEEE802.11a scheme, when a part of the communication specifications are changed and a coding mode having a different coding rate from that in the related art is added, a change of wireless communication apparatus 100 to a new function supporting the communication standard will be described below. In this case, it is assumed that there is no change in specifications except for the codec.

Wireless communication apparatus 100 needs to change its wireless communication processing function in order to support this new communication scheme. When reconfigurable digital signal processing section 103 includes a plurality of process function modules as shown in FIG. 3, wireless communication apparatus 100 may reconfigure only the function of the function module to be changed. In this case, it is preferable to change only the function of reconfigurable function module 1031a performing the codec process.

Reconfiguration control section 107 reads out software programs or configuration parameters related to codec algorithms that can support a new coding module from reconfiguration memory 106 through reconfiguration control bus 108, and reconfigures reconfigurable function module 1031a.

Further, the reconfiguration control is performed to write properties related to the function and performance of the codec processes that are newly set in new property register 10311a. When a new coding mode to be supported is added to the coding module whose function and performance are newly changed, the processing latency thereof is likely to change from the previous processing latency according to design, such as buffering. In this case, it is preferable to write applicable information in a predetermined address of the property register of reconfigurable function module 1031a.

In this embodiment, when the processing latency in transmission coding is changed to $td_a''$, the value $n_a''$ obtained by converting the latency into the number of clocks, may be newly written in address #05 of the property register. In this way, communication control section 104 completes the reconfiguration of reconfigurable function module 1031a, and controls property collecting section 1041 to collect various items of property information newly written. In addition, among the items of property information, information about the transmission processing latency is extracted by latency information extracting section 1042, and then the transmission process start timing may be determined by the same method as described above during the transmission process.

As described above, according to this embodiment, property information about the function and performance of each of the signal processing sections and the reconfigurable function modules is stored in the signal processing sections and the reconfigurable function modules, and communication control section 104 collects necessary property information and uses the collected information to perform communication control. Consequently, it is possible to correct changes in communication performance due to variations in details of processing in the reconfigurable digital signal processing section based on property information.

To be more specific, even when the processing latency of each of the processing sections and the function modules varies due to changes in functions of the function modules, information about processing latency is automatically collected from property information, the total delay time of a transmission system is estimated, and the transmission timing is corrected. Consequently, it is possible to perform communication in performance matching the specifications related to the transmission timing of the wireless communication standard after the change of functions.

Further, this embodiment is effective even when part of the functions of the reconfigurable function modules changes. Even when the functions of the reconfigurable function modules need to be updated or changed in the sections of functional blocks, it is possible to easily perform the change in the functions and performances of the reconfigurable function modules and a change in the details of communication control caused by the change in the function and performance. In addition, the development of algorithms involved by the change in the functions of the reconfigurable function modules can be effectively performed in the sections of the function modules, and wireless communication control can be changed effectively.

Further, in the above description, reconfiguration control and data transmission for collecting the property information held in the processing sections and the function modules are performed through a common bus, but the invention is not limited to this. For example, a dedicated bus for reading property information held in the property registers of the function modules may be separately provided, or dedicated lines for transmitting read data may be independently connected to the processing sections and the function modules, which are also within the scope of the invention.

Further, in the above description, for simplicity of explanation, latency between the input and output of I/O section 1033 is not described. When fixed latency is generated between the input and output of I/O section 1033, the latency value may be estimated in advance, and communication control section 104 may perform correction with the estimated latency value when determining the transmission process start timing. In addition, I/O section 1032 may be configured such that the function and performance thereof are reconfigurable, and, similar to reconfigurable function modules 1031, a property register for holding set functions (for example, latency or capacity of FIFO) may be provided in I/O section 1032. Then, communication control including I/O section 1032 may be performed.

Furthermore, in the above description, reconfigurable function modules 1031 are cascaded-connected to perform a series of transmitting and receiving processes, but the connection between the function modules is not limited to this. For example, the reconfigurable function modules may be connected to a common data bus, or a combination of cascade connection and bus connection may be used.

Moreover, in the above description, each of the processing sections and the function modules has both a transmitting function and a receiving function, but the invention is not limited to this. For example, transmitting function modules and receiving function modules may be provided separately.

Further, in the above description, it is assumed that reconfigurable function modules 1031 have the same operation clock, but the invention is not limited to this. The function modules may have different operation clocks. For example, reconfigurable function modules 1031a and 1031b may be operated at a clock frequency $f_{clk1}$, and the other function modules and the processing sections may be operated at a clock frequency $f_{clk2}$. In this case, it is possible to use information of the process latencies generated from the function modules to estimate the total processing delay time $t_1$ of a digital transmission process, as shown in the following equation 3.

Furthermore, in a wireless communication standard which wireless communication apparatus 100 supports, propagation delay time generated when radio signals are transmitted through a wireless channel between communication apparatuses may be estimated, and, when specifications for correcting transmission timing are prescribed, transmission timing determining section 1044 may determine the transmission start timing in consideration of the correction of the propagation delay time.

[3]

$$\begin{aligned} t_1 &= (td_a + td_b + td_c + td_e + td_{adda} + td_{ana}) \quad \text{(Equation 3)} \\ &= (n_a + n_b) \times (1/f_{clk1}) + (n_c + n_e + n_{adda} + n_{ana}) \times \\ &\quad (1/f_{clk2}) \end{aligned}$$

Further, in the above description, how communication control section 104 detects the completion of reconfiguration is not particularly described. However, for example, reconfiguration control section 107 may transmit control information indicating the completion of reconfiguration to communication control section 104 through reconfiguration control bus 108, or a dedicated control line for indicating the completion of reconfiguration may be connected between reconfiguration control section 107 and communication control section 104, in order to detect the completion of the reconfiguration.

Further, in the above description, it is assumed that the arrangement of information held in property registers provided in individual processing sections and function modules is the same between processing sections and function modules, but the invention is not limited to this. As long as property collecting section 1041 of communication control section 104 knows which property is held in which address in property registers in processing sections and function modules, the arrangement of property information ma vary between processing sections and function modules or the same property information may be held in all processing sections and function modules. For example, property register 1011 of analog signal processing section 101 does not need to hold information about the clock rate, buffer size, and circuit size. When latency is negligibly small as compared to the latencies in other digital signal processing sections, an area for holding information about the latency may not be provided.

Further, when a certain communication function is set, there are a plurality of communication modes, and communication control needs to be performed to switch the communication modes for communication, communication control setting may be changed for each communication mode. In this case, for example, as shown in FIG. 7, properties related to the function and performance of each communication mode may be held in the property register, property information may be collected every time the communication mode is changed, and the collected property information may be used for communication control.

According to Embodiment 1, wireless communication apparatus 100 includes: reconfigurable digital signal processing section 103 that includes a plurality of function sections (reconfigurable function modules) related to communication, and reconfigures the functions of the function sections to perform digital signal processing supporting the plurality of communication systems; reconfiguration control section 107 that controls the reconfiguration of the functions; property registers 10311 that holds communication control information (for example, latency information) corresponding to the plurality of the function sections; and communication control section 104 that performs communication control (for example, transmission timing control) based on the communication control information held in property registers 10311. Reconfiguration control section 107 overwrites the communication control information in property registers 10311 every time the functions are reconfigured.

In this way, when reconfiguration control section 107 reconfigures the communication function of wireless communication apparatus 100, the communication control information is written in property registers 10311, and communication control section 104 performs communication control using the communication control information held in property registers 10311. Consequently, it is possible to correct the details of communication performance required to be corrected when the communication function is changed. In addition, even when it is necessary to change a part of the functions of the plurality of function sections, it is possible to easily change the functions and performance in part of the function sections and change the details of accompanying communication control. Consequently, it is possible to perform communication using communication control information that is appropriately corrected, and thus provide a wireless communication apparatus capable of improving communication quality. In addition, even when the function of wireless communication apparatus 100 is changed, wireless communication apparatus 100 performs adaptive correction. Consequently, it is possible to effectively develop modules without restrictions upon specifications.

Further, latency information related to the processing delay time between the input and output of each of the function sections when the function section performs its function is used as one communication control items of information overwritten in property registers 10311. As an example of communication control, communication control section 104 collects latency information of the function sections written in corresponding property registers 10311, and determines the start timing of transmission signal processing based on collected latency information.

In this way, it is possible to correct the details of communication performance required to be corrected when the communication function is changed, particularly, the transmission process timing in this embodiment. In addition, it is possible to perform communication using communication control information that is appropriately corrected, and thus provide a wireless communication apparatus capable of improving communication quality.

Furthermore, communication control section 104 of wireless communication apparatus 100 includes: property collecting section 1041 that collects property information of the function sections held in property registers 10311; latency information extracting section 1042 that extracts latency information from the property information; processing delay time estimating section 1043 that estimate the total processing delay time of a transmission system of the apparatus based on the extracted latency information; and transmission timing determining section 1044 that determines the start timing of the transmission signal processing in reconfigurable digital signal processing section 103 based on the estimated total processing delay time of the transmission system and system timing information. Wireless communication apparatus 100 is provided with timer 105 that outputs the system timing information in synchronization with a wireless communication system to which the apparatus (wireless communication apparatus 100) supports, and outputs a transmission process enable signal to reconfigurable digital signal processing section 103 based on the determined information about the start timing of the transmission signal processing of reconfigurable digital signal processing section 103.

The communication control information overwritten in property registers 10311 includes at least one of information about a clock frequency in a signal input stage, information about a clock frequency in a signal output stage, information about a buffer size in the signal input stage, information about a buffer size in the signal output stage, and information about a circuit size used.

(Embodiment 2)

In Embodiment 2, information about the gain between the input and the output of each function module can be provided as one property related on the function and performance of the function module. A process of using the information to correct the amplitude of a transmission signal and a measured value of received power will be described with reference to FIGS. 8 and 9.

Figure 8:
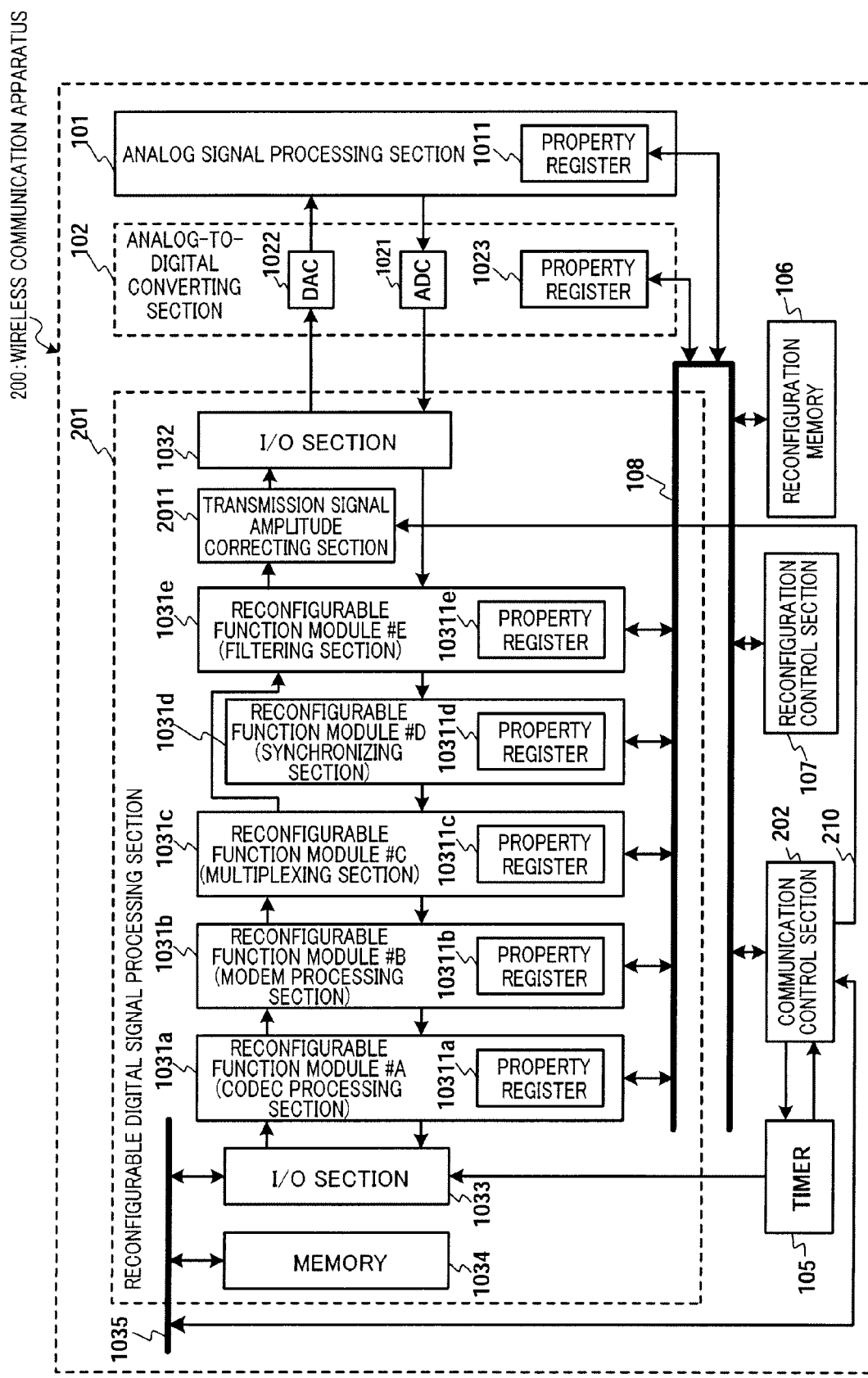
FIG. 8 shows an example of the configuration of a wireless communication apparatus according to an Embodiment 2 of the invention.

FIG. 8 shows the configuration of wireless communication apparatus 200 according to Embodiment 2. In FIG. 8, the same components as in wireless communication apparatus 100 shown in FIG. 3 are assigned the same reference numerals. The wireless communication apparatus according to Embodiment 2 differs from that shown in FIG. 3 in that reconfigurable digital signal processing section 201 and communication control section 202 are provided instead of reconfigurable digital signal processing section 103 and communication control section 104, and control line 210 for correcting the amplitude of a transmission signal is connected between communication control section 202 and reconfigurable digital signal processing section 201. In addition, in communication control section 202, the illustration and description of the same components and connection relationship therebetween required for transmission timing control as in Embodiment 1 will not be repeated.

Reconfigurable digital signal processing section 201 processes digital signals used in a wireless communication process of wireless communication apparatus 200, and the basic configuration and operation thereof are similar to those of reconfigurable digital signal processing section 103 shown in FIG. 3, except that the transmission signal processing system is provided with transmission signal amplitude correcting section 2011. In this embodiment, transmission signal amplitude correcting section 2011 is connected to the output end of reconfigurable function module 1031e.

Transmission signal amplitude correcting section 2011 is connected to communication control section 202 by control line 210 for correcting the amplitude of a transmission signal and receives the transmission signal from communication control section 202. Transmission signal amplitude correcting section 2011 corrects the amplitude of the received transmission signal based on an amplitude correction value transmitted through control line 210 for amplitude correction, and the operation of transmission signal amplitude correcting section 2011 will be described in detail below.

Figure 9:
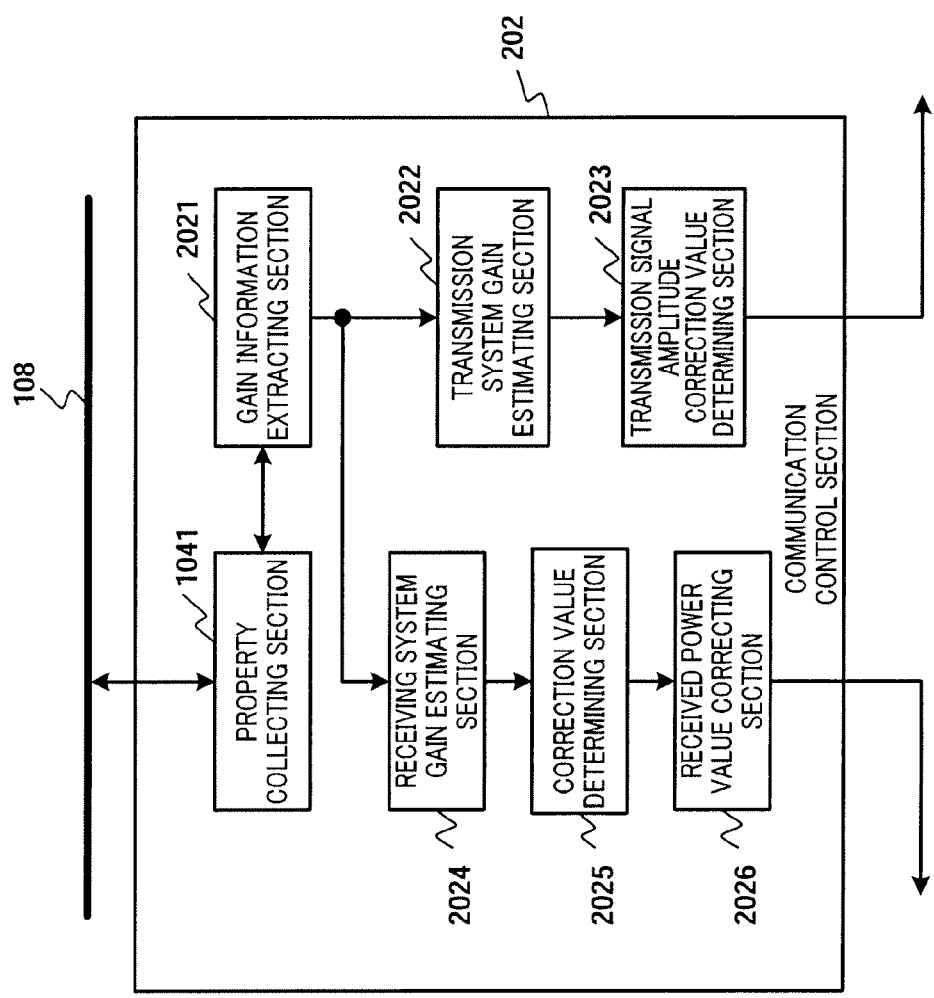
FIG. 9 shows an example of the configuration of a communication control section according to Embodiment 2 of the invention.

Communication control section 202 controls a wireless communication operation of wireless communication apparatus 200. In this embodiment, communication control section 202 corrects the amplitude of the transmission signal and the measured value of received power, as an example of communication control. FIG. 9 shows an example of the configuration of communication control section 202 according to this embodiment. Communication control section 202 includes property collecting section 1041, gain information extracting section 2021, transmission system gain estimating section 2022, transmission signal amplitude correction value determining section 2023, receiving system gain estimating section 2024, correction value determining section 2025, and received power value correcting section 2026.

In this embodiment, property collecting section 1041 is operated in the same manner as shown in FIG. 3.

Gain information extracting section 2021 extracts only information about gain from property information of analog signal processing section 101, analog-to-digital converting section 102, and function modules of reconfigurable digital signal processing section 201 collected by property collecting section 1041, and then outputs the extracted information.

Transmission system gain estimating section 2022 estimates the total gain of a transmission system based on the gain information of the processing sections and the function modules during a transmission process, which is extracted by gain information extracting section 2021, and outputs the estimated gain.

Transmission signal amplitude correction value determining section 2023 determines a correction value for amplitude correction required to satisfy a communication standard, based on the total gain of the transmission system transmitted from transmission system gain estimating section 2022, and outputs the correction value through control line 210 for correcting the amplitude of a transmission signal.

Receiving system gain estimating section 2024 estimates the total amount of gain of the receiving system based on gain information in the receiving process of each of the processing sections and the function modules that is extracted by gain information extracting section 2021 and outputs the estimated gain.

Correction value determining section 2025 determines a correction value when received power is measured based on the total amount of gain of the receiving system supplied from receiving system gain estimating section 2024, and outputs the determined correction value.

Received power value correcting section 2026 measures the power of a received signal based on the average amplitude square value of the received signal and the correction value determined by correction value determining section 2025, and outputs the measured result.

Further, in this embodiment, any one of the processing sections or the function modules in the receiving system of wireless communication apparatus 200 calculates a square $p_{ave}$ of the average amplitude of the received signals using equation 4, and write the calculated result in a predetermined address of memory 1034, but the details of the process are not particularly limited in the invention. For example, the amplitudes of all the sampling signals may be used in calculation in the output end of the filter, and the amplitudes of the signals may be averaged in the demodulation stage.

[4]

$$p_{ave} = \frac{1}{N}\sum_i^N a^2 \qquad \text{(Equation 4)}$$

where "a" is the amplitude of a received signal and "N" is the number of samples used in the averaging process.

In wireless communication apparatus 200 having the above-mentioned configuration, information about the gain between the input and output of each function module can be provided as one property related to the functions and performances of the function modules, and the provided information about the gain between the input and the output of each function module can be used to correct transmission power and the measured value of received power. The correction process will be described below. With this embodiment, it is assumed that the function of wireless communication apparatus 200 supports the IEEE802.11a scheme and the functions of analog signal processing section 101, analog-to-digital converting section 102, and the function modules 1031 of reconfigurable digital signal processing section 201 are set to support the IEEE802.11a scheme. In addition, it is assumed that, in the property registers of the processing sections and the function modules, the same property information is written in the same address as shown in FIG. 4.

In communication control section 202, when the functions of the processing sections and the function modules are completely set in wireless communication apparatus 200, property collecting section 1041 collects property information written in the property register of each processing section and function module. In this case, information about the gain between input and output during the transmission process, that is, information about the power ratio between input and output is written indecibels (dB) in address #06 in each property register. In addition, the gain between input and output during a receiving process is written indecibels (dB) in address #16.

Gain information extracting section 2021 extracts only the items of information on the gains during the transmission process and the receiving process that are respectively stored in the addresses #06 and #16 from among the items of property information of the processing sections and the function modules collected by property collecting section 1041. Then, gain information extracting section 2021 transmits the gain information about the transmission process to transmission system gain estimating section 2022, and transmits the gain information about the receiving process to the transmission system gain estimating section 2024.

In this case, it is assumed that the gains of reconfigurable function modules 1031a, 1031b, 1031c, and 1031e, analog-to-digital converting section 102, and analog signal processing section 101 during the transmission process are $g_{tx\_a}$, $g_{tx\_b}$, $g_{tx\_c}$, $g_{tx\_e}$, $g_{tx\_adda}$, and $g_{tx\_ana}$, respectively. In addition, when the total gain of the transmission system in wireless communication apparatus 200 is $g_{tx\_11a}$, it is assumed that wireless communication is performed with a predetermined transmission power supporting the IEEE802.11a scheme, without correcting the amplitude of a transmission signal. In addition, the gain values are converted into decibels (dB).

Transmission system gain estimating section 2022 calculates the total gain $g_{tx\_total}$ of the transmission system in the current setting of functions using equation 5. Transmission signal amplitude correction value determining section 2023 uses the total gain $g_{tx\_total}$ of the transmission system calculated by transmission system gain estimating section 2022 to determine the power correction value $g_{tx\_c}$ for obtaining desired transmission power during the transmission process based on equation 6. Then, transmission signal amplitude correction value determining section 2023 outputs the correction value to transmission signal amplitude correcting section 2011 through control line 210 for correcting the amplitude of the transmission signal.

$$g_{tx\_total} = g_{tx\_a} + g_{tx\_b} + g_{tx\_c} + g_{tx\_e} + g_{tx\_adda} + g_{tx\_ana} \qquad \text{(Equation 5)}$$

$$g_{tx\_c} = g_{tx\_11a} - g_{tx\_total} \qquad \text{(Equation 6)}$$

Transmission signal amplitude correcting section 2011 uses the correction value for correcting the amplitude of the transmission signal transmitted from transmission signal amplitude correction value determining section 2023 to correct the amplitude of an input signal, and outputs the corrected signal to I/O section 1032. To be more specific, amplitude correction is equivalent to performing amplitude multiplication, that is, multiplying the input signal by a gain matching the correction value or by a coefficient matching attenuation.

In this way, in the processing sections and the function modules of wireless communication apparatus 200, the gain between input and output in the set function is written in property, and signals can be transmitted with desired transmission power based on the gain during the transmission process.

Next, the operation will be described assuming that the gains of reconfigurable function modules 1031a, 1031b, 1031c, and 1031e, analog-to-digital converting section 102, and analog signal processing section 101 during the receiving process are $g_{rx\_a}$, $g_{rx\_b}$, $g_{rx\_c}$, $g_{rx\_e}$, $g_{rx\_adda}$, and $g_{rx\_ana}$, respectively. In addition, when the total gain of the receiving system in wireless communication apparatus 200 is $g_{rx\_11a}$, it is assumed that received power is measured in the IEEE802.11a scheme, without correcting the measured value of the received power.

The IEEE802.11a standard does not particularly prescribe the measurement of received power. However, in this embodiment, it is assumed that wireless communication apparatus 200 performs the IEEE802.11h standard and wireless communication supporting the IEEE802.11h standard. In this case, the wireless communication apparatus measures received power at the request of the other station and notifies the measured result to the other station.

Receiving system gain estimating section 2024 calculates the total gain $g_{rx\_total}$ of the receiving system in the current setting of functions using equation 7. The received power correction value determining section 2025 uses the total gain $g_{rx\_total}$ of the receiving system that is calculated by receiving system gain estimating section 2024 to determine the correction value $g_{rx\_c}$ for correcting the measured received power to obtain an appropriate received power value, based on equation 8, and outputs the determined correction value to received power value correcting section 2026.

$$g_{rx\_total} = g_{rx\_a} + g_{rx\_b} + g_{rx\_c} + g_{rx\_e} + g_{rx\_adda} + g_{rx\_ana} \quad \text{(Equation 7)}$$

$$g_{rx\_c} = g_{rx\_11a} - g_{rx\_total} \quad \text{(Equation 8)}$$

Received power value correcting section 2026 calculates a received power value based on the square of the average amplitude of received signals that is written in a predetermined address of memory 1034 and the input correction value. The calculation can be performed by, for example, equation 9.

$$p_{rx} = p_{ave} + g_{rx\_c} + \alpha [\text{dBm}] \quad \text{(Equation 9)}$$

(where $\alpha$ is a conversion factor between a received power value $p_{rx}$ and the square $p_{ave}$ of the average amplitude that is calculated in advance by, for example, calibration under the condition that the total gain $g_{rx\_total}$ of the receiving system is equal to $g_{rx0}$, that is, $g_{rx\_c} = 0$ [dB]).

In this way, the gain value between input and output in the function set in each of the processing sections and the function modules in wireless communication apparatus 200 is written in a property. When received power is measured, a correction value for the measured value is determined based on the gain value, and correction is performed. As a result, it is possible to accurately measure the received power value.

In addition, when wireless communication apparatus 200 performs a wireless communication process supporting the IEEE802.11a scheme, a change in the characteristics of a transmitting and receiving filter of reconfigurable function module 1031e will be described below. Wireless communication apparatus 200 may change the characteristics of the transmitting and receiving filter to obtain various advantages.

For example, it is possible to perform a filtering process having filtering characteristics and the amount of computation suitable for situations by changing attenuation characteristics in a frequency band beyond the pass band according to the degree of the mixture of external interfering waves, or it is possible to perform a filtering process having characteristics satisfying specifications even when specifications of a spectrum mask are changed due to the revision of a communication standard.

When there is no change in the gain between the input and output of the filter during the switching of the function of the filter, it is not necessary to change the transmission power value or the measured value of received power and correct the amplitude or the measured value. However, this is likely to restrict degree of freedom in the characteristic design of the filter.

Therefore, with the present invention, every time the function of the filter is changed, the gain between input and output is written in predetermined addresses (in this case, addresses #06 and #16) of property register 10311e, and the gain is used to correct the amplitude or the measured value. Accordingly, it is possible to enhance the degree of freedom in the function design of the filter, without depending on the gain between the input and output of the filter.

Further, with this embodiment, it is assumed that wireless communication apparatus 200 corrects the amplitude of a transmission signal and the measured value of received power, but the invention is not limited to this. For example, wireless communication apparatus 200 may correct one of the amplitude of a transmission signal and the measured value of received power.

Furthermore, in this embodiment, the amplitude of the transmission signal is corrected in the rear stage of reconfigurable function module 1031e, but the invention is not limited to this. The amplitude of the transmission signal may be corrected in any stage. For example, an amplifier having a variable gain may be integrated into analog-to-digital converting section 102, and control line 210 for correcting the amplitude of the transmission signal may be connected as a gain control signal line to the amplifier having a variable gain, in order to perform communication control. Further, the amplifier having a variable gain may be integrated into analog signal processing section 101. Alternatively, the amplifier having a variable gain may be provided as a portion of any one of the other reconfigurable function modules.

Moreover, in this embodiment, during the measurement of received power, communication control section 202 corrects the measured value of received power based on the average amplitude square value of received signals that is held in memory 1034, but the invention is not limited to this.

For example, the calculation and correction of a received power value may be performed in an upper-layer process, the correction value calculated by communication control section 202 may be written in a predetermined address of memory 1034, and a host processing section that calculates the received power value may read out the square of the average amplitude of received signals and the correction value written in predetermined addresses of memory 1034 to perform calculation including the correction of the received power value. Alternatively, any one of the function modules of reconfigurable digital signal processing section 201 may perform calculation for received power value correction, and the correction value calculated by communication control section 202 may be supplied to the function module that performs the correction process.

As described above, according to Embodiment 2, wireless communication apparatus 200 includes: reconfigurable digital signal processing section 103 that includes a plurality of function sections (reconfigurable function modules) related to communication, and reconfigures the functions of the function sections to perform digital signal processing supporting the plurality of communication systems; reconfiguration control section 107 that controls the reconfiguration of the functions; property registers 10311 that holds communication control information (for example, gain values) corresponding to the plurality of function sections; and communication control section 202 that performs communication control (for example, controlling the amplitude of a transmission signal) based on the communication control information held in property registers 10311. Reconfiguration control section 107 overwrites the communication control information in property registers 10311 every time the functions are reconfigured.

Further, the items of information overwritten in property registers 10311 include information about the gain between the input and output of each of the function sections during a transmission process. As an example of communication control, the communication control section collects the information (gain value) on the gain during the transmission process that is written in property registers 10311, and corrects the amplitude of a transmission signal based on the collected gain information.

In this way, it is possible to correct details to be corrected in communication performance when the function is changed, that is, the amplitude of a transmission signal, and perform communication using the communication control information that is appropriately corrected. Consequently, it is possible to provide a wireless communication apparatus capable of improving communication quality.

Further, communication control section 202 of wireless communication apparatus 200 includes: property collecting section 1041 that collects property information of the function sections written in property registers 10311; gain information extracting section 2021 that extracts information about gain in the transmission process from the property information; transmission system gain estimating section 2022 that estimates the total gain of the transmission system of the apparatus based on the extracted gain information; and transmission signal amplitude correction value determining section 2023 that determines the gain correction value of the transmission signal of reconfigurable digital signal processing section 201 based on the estimated total gain of the transmission system and a transmission power specification in a wireless communication system to which the apparatus (wireless communication apparatus 200) supports. Wireless communication apparatus 200 further includes transmission signal amplitude correcting section 2011 that corrects the amplitude of a transmission signal from a transmission signal processing system of reconfigurable digital signal processing section 201, based on the gain correction value determined by transmission signal amplitude correction value determining section 2023.

Furthermore, the communication control information overwritten in property registers 10311 includes information about the gain between the input and output during a receiving process of each of the function sections. As an example of communication control, communication control section 202 collects the information about the gain during the receiving process that is written in property registers 10311, and corrects the measured value of received power based on the collected gain information.

In this way, it is possible to correct details to be corrected in communication performance when the function is changed, that is, the measured value of received power, and appropriately measure a received power value. As a result, it is possible to perform communication control, such as the transmission of feedback information to a base station, based on the communication control information (the measured value of received power) that has been appropriately corrected, and thus provide a wireless communication apparatus capable of improving communication quality.

Further, communication control section 202 of wireless communication apparatus 200 includes: property collecting section 1041 that collects property information written in property registers 10311; gain information extracting section 2021 that extracts information about gain in the receiving process from the property information; receiving system gain estimating section 2024 that estimates the total gain of the receiving system of the apparatus (wireless communication apparatus 200) based on the extracted gain information; correction value determining section 2025 that determines a correction value when the reconfigurable digital signal processing section measures received power, based on the estimated total gain of the receiving system; and received power value correcting section 2026 that corrects the measured value of received power, based on the correction value determined by correction value determining section 2025, the square of the average amplitude of received signals calculated by a receiving system of reconfigurable digital signal processing section 201, and a conversion factor between the square of the average amplitude and the received power value that is held in advance.

(Other Embodiments)

In the wireless communication apparatuses 100 and 200 according to the first and Embodiment 2s, property registers 10311 that store property information are provided in analog signal processing section 101, analog-to-digital converting section 102, and the processing sections and the function modules of the reconfigurable digital signal processing sections 103 and 201. In the above-mentioned configuration, when the function is changed, communication control section 104 or 202 that rewrites property information about the processing latency or the gain stored in property registers 10311 can correct the transmission timing, the amplitude of a transmission signal, or the measured value of received power on the basis the rewritten property information, but the invention is not limited to this. For example, the following embodiments can be made.

For example, when the number of quantization bits of analog-to-digital converting circuit 1021 or digital-to-analog converting circuit 1022 of analog-to-digital converting section 102 is variable with a change in the function, information about the number of quantization bits set according to the change in the function may be written in a predetermined address of property register 1023. In this case, for example, communication control section 104 or 202 can check a dynamic range of signals that can be processed by analog-to-digital converting section 102. In addition, the details of control of signal processing of analog signal processing section 101 or reconfigurable digital signal processing section 103 or 201 can be changed based on the dynamic range of the signals.

To be more specific, for example, when the number of quantization bits set in analog-to-digital converting section 102 is large, that is, the set dynamic range is wide, it is possible to improve floor noise characteristics on a frequency axis in the transmission system. Therefore, the characteristics of a transmission amplifier of analog signal processing section 101 may be changed such that the transmission amplifier can be operated with high efficiency, and the transmission system may be controlled so as to satisfy transmission specifications of the supporting wireless communication standard.

Further, since the receiving system does not need to minutely adjust the amplitude of received signals, it is possible to simplify a gain control process of a variable gain amplifier in the receiving system of analog signal processing section 101, and it is also possible to reduce the number of control processes.

In contrast, when the number of quantization bits set in analog-to-digital converting section 102 is small, that is, the set dynamic range is narrow, the function of analog signal processing section 101 is changed to minutely perform control. In addition, the number of valid bits processed by the reconfigurable digital signal processing sections 103 and 201 may be reduced. In this case, the wireless communication apparatus changes its function such that the width of the valid bit is reduced and the amount of circuit computation is reduced and then performs wireless communication. As a result, it is possible to reduce the power consumed by the wireless communication apparatuses 100 and 200.

As described above, in wireless communication apparatus (100, 200), processing section (analog signal processing section 101) that processes transmission and received analog signals is configured such that its function and performance can be changed, and another property register (1011) that holds property information about the function or performance of analog signal processing section (101) is provided. In addition, communication control section (104, 202) performs communication control based on communication control information held in property register (10311) and information about the function or performance written in another property register (1011).

In this way, it is possible to correct the details of communication performance to be corrected when the function or performance of analog signal processing section (101) is changed, as well as the details of communication performance to be corrected when the function of the function section (reconfigurable function module) is changed. After the correction is appropriately performed, it is possible to perform communication based on communication control information and information about the function or performance. As a result, it is possible to provide a wireless communication apparatus capable of improving communication quality.

Furthermore, wireless communication apparatus (100, 200) is provided with digital-to-analog converting circuit (1022) that converts the digital signal transmitted from reconfigurable digital signal processing section (103, 201) into an analog signal and outputs the analog signal to analog signal processing section (101), and analog-to-digital converting circuit (1021) that converts the analog signal received from analog signal processing section (101) into a digital signal and outputs digital signal to reconfigurable digital signal processing section (103, 201). Digital-to-analog converting circuit (1022) and analog-to-digital converting circuit (1021) are configured such that the sampling frequencies or the number of quantization bits thereof are changeable. In addition, another property register (1023) that holds information about the sampling frequencies or the number of quantization bits as the communication control information is provided. Communication control section (104, 202) performs communication control based on the communication control information written in two property registers (10311 and 1023).

In this way, it is possible to correct the details of communication performance to be corrected when the sampling frequency or the number of quantization bits of digital-to-analog converting circuit (1022) and analog-to-digital converting circuit (1021) is changed, as well as the details of communication performance to be corrected when the function of the function section (reconfigurable function module) is changed. After the correction is appropriately performed, it is possible to perform communication based on communication control information. As a result, it is possible to provide a wireless communication apparatus capable of improving communication quality.

Figure 10:
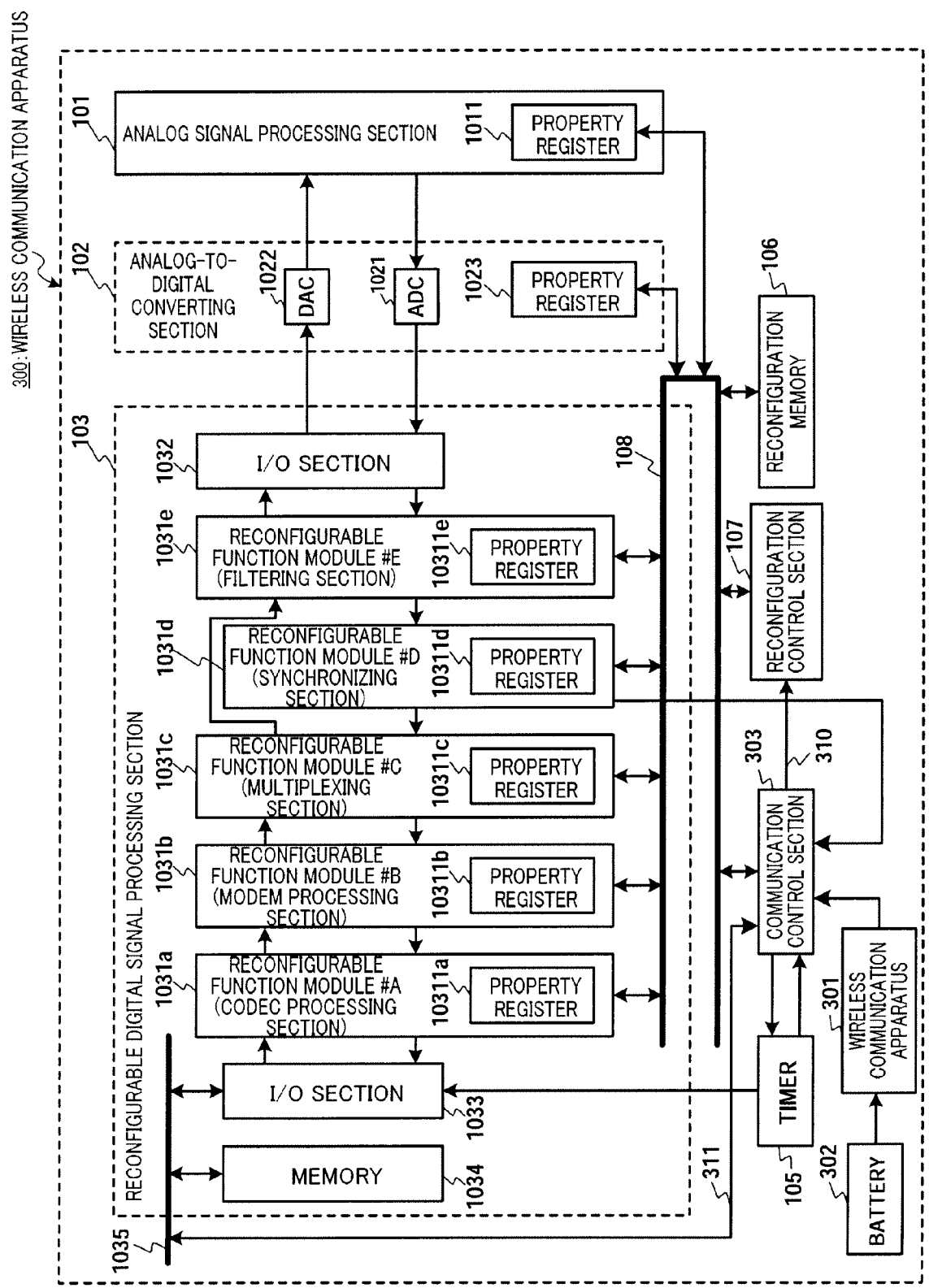
FIG. 10 shows an example of the configuration of a wireless communication apparatus according to another embodiment of the invention.

Furthermore, as shown in FIG. 10, the wireless communication apparatus is provided with apparatus state monitoring section 301 that monitors various states of the apparatus, and the function of each function module and processing section is changed according to the state of the apparatus such that the optimum function and performance are obtained among a plurality of function candidates. As a result, it is possible to effectively operate a wireless communication apparatus.

For example, when wireless communication apparatus 300 is driven by a battery, apparatus state monitoring section 301 may periodically check information about the remaining level of battery 302. In this case, when the remaining level of battery 302 of wireless communication apparatus 300 is sufficiently high or wireless communication apparatus 300 is supplied with power from another power supply, in order to improve wireless communication performance, for example, the number of quantization bits or the sampling rate of analog-to-digital converting section 102 is set such that a sufficiently larger margin is ensured than a required performance. Similarly, each function module of reconfigurable digital signal processing section 103 changes the details of its processing to cope with a large number of quantization bits.

Meanwhile, when apparatus state monitoring section 301 determines that the remaining battery level is low, the function and performance of analog-to-digital converting section 102 are changed such that the margin of the number of quantization bits is reduced within a permissible range of specifications required by the wireless communication standard. Similarly, each function module of reconfigurable digital signal processing section 103 changes the details of its processing to cope with a small number of quantization bits.

In addition, when this control is performed, it is necessary to further change the configuration shown in FIG. 3 as follows. First, it is necessary to write all the items of property information about various details of processing that can be set in the function modules and the processing sections in the property registers. In addition, when wireless communication apparatus 300 starts, reconfiguration control section 107 needs to read all the property information about plural kinds of reconfiguration programs of the function modules and the processing sections that are stored in reconfiguration memory 106, and write the read information in the property registers. Further, in communication control section 303, when it is determined that the function thereof needs to be changed, control line 310 that transmits instructions to perform reconfiguration control is needed.

Further, control line 311 for monitoring a measured value indicating the level of reception quality in wireless communication apparatus 300 needs to be provided. In this case, it is assumed that an index (for example, CNR (carrier per noise ratio)) indicating the reception quality during a receiving process is calculated and then held in a predetermined address of memory 1034, and the index indicating the reception quality is read through control line 311.

According to the above-mentioned configuration and control process, the current conditions of wireless communication apparatus 300 is monitored, and the function of each function module and processing section is changed to be suitable for the current conditions based on the current conditions, the performance margins expected in plural kinds of details of processing that can be set in the function modules and the processing section, and property information about power consumption. Consequently, it is possible to improve battery consumption efficiency in wireless communication apparatus 300.

Furthermore, in the above-described embodiment, as an example, a case where reconfiguration control is performed in consideration of power consumption efficiency, based on property information and information about the remaining battery level of wireless communication apparatus 300 is illustrated, but the following applications can also be adopted.

For example, apparatus state monitoring section 301 may be configured to monitor ambient temperature of the apparatus, and the apparatus may change its function to make the details of processing suitable for temperature conditions. In this case, each function module and processing section may hold specification data for the relationship between the temperature conditions and the performance deterioration as the property information.

The present application is based on Japanese Patent Application No. 2005-259738, filed on Sep. 7, 2005, the entire content of which is expressly incorporated by reference herein.

Industrial Applicability

The wireless communication apparatus and the communication control method according to the present invention are useful to perform an appropriate correction process even when communication control information is changed due to variations in function, thereby improving communication quality.

The invention claimed is:

1. A wireless communication apparatus comprising:
   a plurality of reconfigurable function sections that enable digital signal processing supporting a plurality of communication schemes by reconfiguring functions related to communications; and a communication operation control function section that controls communication operations, wherein:

the reconfigurable function sections each include a property register that holds communication control information; and the communication control section includes:

a reconfiguration control section that overwrites the communication control information in the property registers every time a communication function is reconfigured; and a communication control section that performs communication control based on the communication control information held in the property registers.

2. The wireless communication apparatus according to claim 1, wherein the communication control section integrates a plurality of items of information written in the plurality of property registers, and performs communication control based on the integrated information.

3. The wireless communication apparatus according to claim 1, wherein:

the communication control information overwritten in the property registers includes latency information about a processing delay time between an input and an output produced when a process that is set in each reconfigurable function section is performed; and the communication control section collects the latency information of the reconfigurable function sections written in the property registers and determines a start timing for transmission signal processing based on collected latency information, as one way of communication control.

4. The wireless communication apparatus according to claim 3, further comprising a timer, wherein:

the communication control section includes:

a property collecting section that collects the property information of the reconfigurable function sections written in the property registers;

a latency information extracting section that extracts information related to latency from the property information;

a processing delay time estimating section that estimates a total processing delay time in a transmission system in the apparatus based on the extracted latency information; and a transmission timing determining section that determines the start timing of the transmission signal processing of the plurality of reconfigurable function sections, based on the estimated total processing delay time of the transmission system and information about system timing; and the timer outputs the information about the system timing synchronized with a wireless communication system which the apparatus supports, and outputs a transmission process enable signal, which is a reference for the start of the transmission signal processing based on information about the determined start timing of the transmission signal process in the plurality of reconfigurable function sections.

5. The wireless communication apparatus according to claim 1, wherein:

the communication control information overwritten in the property registers includes information about a gain between input and output during a transmission process that is set in each reconfigurable function section; and the communication control section collects the information about the gain during the transmission process that is written in the property registers as one communication control and corrects the amplitude of a transmission signal in the transmission signal processing, based on the collected gain information.

6. The wireless communication apparatus according to claim 5, further comprising a transmission signal amplitude adjusting section, wherein the communication control section includes:

a property collecting section that collects the property information of the reconfigurable function sections written in the property registers;

a gain information extracting section that extracts the information about the gain during the transmission process from the property information;

a transmission system gain estimating section that estimates the total gain of the transmission system of the apparatus based on the extracted gain information; and a transmission signal amplitude correction value determining section that determines a gain correction value of the transmission signal of each of the plurality of reconfigurable function sections, based on the estimated total gain of the transmission system and a transmission power specification in a wireless communication system which the apparatus supports; and the transmission signal amplitude adjusting section corrects the amplitude of the transmission signal based on the gain correction value determined in the transmission signal amplitude correction value determining section.

7. The wireless communication apparatus according to claim 1, wherein:

the communication control information overwritten in the property registers includes information about a gain between an input and an output during in a receiving process in each reconfigurable function section; and the communication control section collects the information about the gain during the receiving process that is written in the property registers as one of communication control and corrects a measured value of received power based on the collected gain information.

8. The wireless communication apparatus according to claim 7, wherein the communication control section includes:

a property collecting section that collects property information written in the property registers;

a reception gain information extracting section that extracts information about a gain in the receiving process from the property information;

a receiving system gain estimating section that estimates the total gain of a receiving system of the apparatus based on the extracted gain information;

a correction value determining section that determines a correction value when the reconfigurable function sections measure received power, based on the estimated total gain of the receiving system; and a received power value correcting section that corrects a measured value of received power, based on the correction value determined by the correction value determining section, a square of the average amplitude of received signals calculated by the plurality reconfigurable function sections, and a conversion factor between the square of the average amplitude and the measured value of the received power that is held in advance.

9. The wireless communication apparatus according to claim 1, wherein the communication control information written in the property registers includes at least one of information about a clock frequency in a signal input stage, information about a clock frequency in a signal output stage, information about a buffer size in the signal input stage, information about a buffer size in the signal output stage, and information about the size of a circuit used.

10. The wireless communication apparatus according to claim 1, wherein:
   function or performance of a processing section that performs analog signal processing on transmission and received signals can be changed;
   another property register that holds property information about the function or performance of the processing is provided; and
   the communication control section performs communication control based on the communication control information held in the property registers and information about the function or performance written in the another property register.

11. The wireless communication apparatus according to claim 1, further comprising:
   a digital-to-analog converting circuit that converts digital signals transmitted from the reconfigurable function sections into analog signals and outputs the analog signals to an analog signal processing section; and
   an analog-to-digital converting circuit that converts analog signals received from the analog signal processing section into digital signals and outputs the digital signals to the reconfigurable function sections, wherein:
   sampling frequencies and the number of quantization bits of the digital-to-analog converting circuit and the analog-to-digital converting circuit are variable;
   another property register that holds information about the sampling frequencies or the number of quantization bits as the communication control information is provided; and
   the communication control section performs communication control based on the communication control information written in the two types of property registers.

12. A communication control method comprising the steps of:
   every time a plurality of reconfigurable function sections related to communication are reconfigured, writing communication control information in a plurality of property registers of the reconfigurable function sections; and
   integrating a plurality of items of information written in the plurality of property registers, and performing communication control based on the integrated information.

* * * * *